(12) United States Patent
Hagiwara et al.

(10) Patent No.: US 11,162,538 B2
(45) Date of Patent: Nov. 2, 2021

(54) METHOD AND DEVICE FOR MANUFACTURING BEARING UNIT

(71) Applicant: NSK LTD., Tokyo (JP)

(72) Inventors: Nobuyuki Hagiwara, Fujisawa (JP); Kazuto Kobayashi, Fujisawa (JP); Isao Shintou, Fujisawa (JP); Hiroshi Koyama, Fujisawa (JP); Toshio Nakamura, Fujisawa (JP)

(73) Assignee: NSK LTD., Tokyo (JP)

( * ) Notice: Subject to any disclaimer, the term of this patent is extended or adjusted under 35 U.S.C. 154(b) by 52 days.

(21) Appl. No.: 16/700,171

(22) Filed: Dec. 2, 2019

(65) Prior Publication Data

US 2020/0102987 A1 Apr. 2, 2020

Related U.S. Application Data

(62) Division of application No. 15/572,581, filed as application No. PCT/JP2016/070551 on Jul. 12, 2016, now Pat. No. 10,557,505.

(30) Foreign Application Priority Data

Jul. 13, 2015 (JP) ................................ 2015-139543
Oct. 2, 2015 (JP) ................................ 2015-196510

(51) Int. Cl.
*F16C 43/08* (2006.01)
*B21K 25/00* (2006.01)
(Continued)

(52) U.S. Cl.
CPC .............. *F16C 43/08* (2013.01); *B21D 39/00* (2013.01); *B21D 39/023* (2013.01); *B21J 5/12* (2013.01);
(Continued)

(58) Field of Classification Search
CPC ...... F16C 43/08; F16C 43/083; F16C 43/086; F16C 226/52; F16C 35/063;
(Continued)

(56) References Cited

U.S. PATENT DOCUMENTS 1,625,131 A 4/1927 Miller
3,933,230 A 1/1976 Adachi
(Continued)

FOREIGN PATENT DOCUMENTS

CN 1309592 A 8/2001
CN 101031375 A 9/2007
(Continued)

OTHER PUBLICATIONS

Communication dated Jul. 3, 2020 from The State Intellectual Property Office of P R. China in Application No. 201680040787.1.
(Continued)

*Primary Examiner* — Christopher J Besler
(74) *Attorney, Agent, or Firm* — Sughrue Mion, PLLC

(57) ABSTRACT

A method of manufacturing a rotating bearing unit includes to cause one end surface in the axial direction of the forming punch (46), formed by combining a plurality of punch elements (46, 46) divided in the circumferential direction, which are displaceable in the axial direction and which are not displaceable in the circumferential direction, and having a processing teeth (44, 44) at one end surface in the axial direction, to face the other end surface of the caulking section (20) in the axial direction. In this state, rolls (30$a$) are rotated about the central axis ($\alpha$) of the hub main body (8) while pressing the other end surface of the forming punch (46) in the axial direction with a pressing surface (43) of the roll (30$a$) having a central axis ($\beta$) that is inclined with respect to the central axis ($\alpha$) of the hub main body (8).

4 Claims, 27 Drawing Sheets

(51) Int. Cl.
  *B21K 1/04*    (2006.01)
  *F16C 43/04*   (2006.01)
  *B21J 9/02*    (2006.01)
  *F16C 35/063*  (2006.01)
  *B21D 39/02*   (2006.01)
  *B21D 39/00*   (2006.01)
  *B21J 5/12*    (2006.01)
  *B21K 1/30*    (2006.01)
  *B60B 35/02*   (2006.01)
  *F16D 1/076*   (2006.01)
  *B21K 1/40*    (2006.01)
  *B21K 1/76*    (2006.01)
  *F16C 19/18*   (2006.01)
  *B60B 35/10*   (2006.01)

(52) U.S. Cl.
  CPC .............. *B21J 9/02* (2013.01); *B21J 9/025* (2013.01); *B21J 9/027* (2013.01); *B21K 1/04* (2013.01); *B21K 1/30* (2013.01); *B21K 1/40* (2013.01); *B21K 1/765* (2013.01); *B21K 25/00* (2013.01); *B60B 35/02* (2013.01); *F16C 19/18* (2013.01); *F16C 35/063* (2013.01); *F16C 43/04* (2013.01); *F16D 1/076* (2013.01); *B60B 35/1081* (2013.01); *F16C 19/186* (2013.01); *F16C 43/086* (2013.01); *F16C 2226/52* (2013.01); *F16C 2326/02* (2013.01)

(58) Field of Classification Search
  CPC ...... B21D 39/048; B21D 39/023; B21J 9/025; B21J 9/027; B21K 1/04; B21K 25/00
  See application file for complete search history.

(56) References Cited

U.S. PATENT DOCUMENTS

| | | | |
|---|---|---|---|
| 2002/0126929 A1 | 9/2002 | Ozawa et al. | |
| 2010/0146790 A1 | 6/2010 | Gingrich | |
| 2013/0174422 A1* | 7/2013 | Bosco | F16D 1/076 29/894.361 |
| 2013/0276500 A1 | 10/2013 | Tsuda | |

FOREIGN PATENT DOCUMENTS

| | | |
|---|---|---|
| CN | 101623736 A | 1/2010 |
| CN | 102026825 A | 4/2011 |
| CN | 103429780 A | 12/2013 |
| CN | 203453296 U | 2/2014 |
| EP | 2 551 032 A1 | 1/2013 |
| ER | 1 123 764 A1 | 8/2001 |
| ER | 2 284 021 A1 | 2/2011 |
| ER | 2 551 031 A1 | 1/2013 |
| ER | 2 551 034 A1 | 1/2013 |
| JP | 63-224833 A | 9/1988 |
| JP | 03-081239 U | 8/1991 |
| JP | 07-317755 A | 12/1995 |
| JP | 2002-081453 A | 3/2002 |
| JP | 2002-254901 A | 9/2002 |
| JP | 2004-162913 A | 6/2004 |
| JP | 2009-292422 A | 12/2009 |
| JP | 2013-224746 A | 10/2013 |
| WO | 2009/139137 A1 | 11/2009 |

OTHER PUBLICATIONS

Practical Hardware Guide, Wanglin PAN, Anhui Science and Technology Press, pp. 361-362, Jan. 2014 (19 pages total).
Communication dated Mar. 3, 2021, from the China National Intellectual Property Administration in application No. 201680040787.1.
"Mold design for composite material products", Xiaoyan AN, National Defense Industry Press, p. 49, Aug. 2014, (7 pages total).
Communication dated Jan. 31, 2019 from the State Intellectual Property Office of the P.R.C. in counterpart CN application No. 201680040787.1.
Communication dated Feb. 27, 2019, from the European Patent Office in counterpart European Application No. 16824461.4.
International Search Report for PCT/JP2016/070551 dated Sep. 6, 2016 [PCT/ISA/210].
Written Opinion for PCT/JP2016/070551 dated Sep. 6, 2016 [PCT/ISA/237].

* cited by examiner

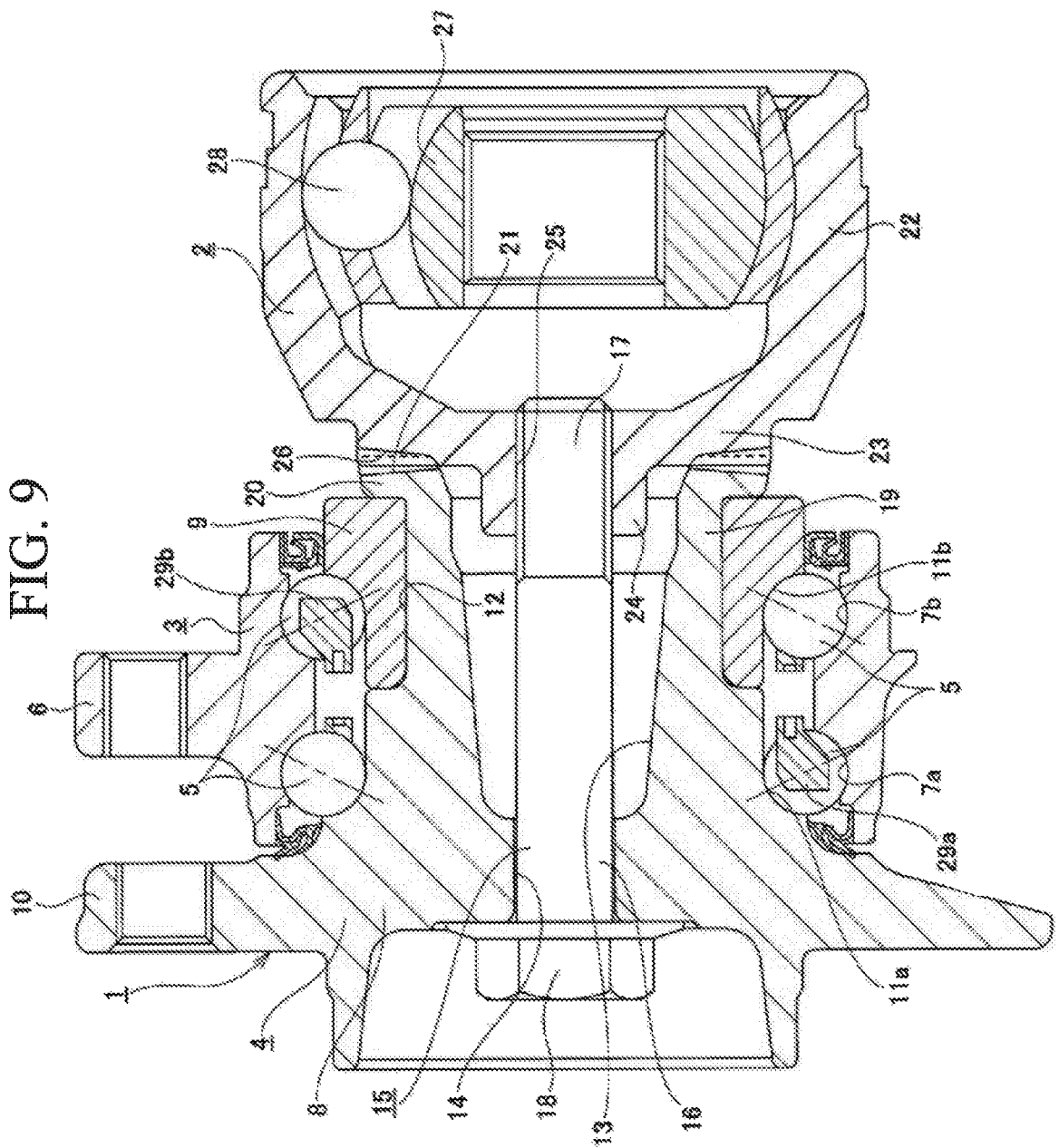

METHOD AND DEVICE FOR MANUFACTURING BEARING UNIT

CROSS REFERENCE TO RELATED APPLICATIONS

This application is a Divisional of U.S. application Ser. No. 15/572,581, filed on Nov. 8, 2017, which is a National Stage of International Application No. PCT/JP2016/070551 filed Jul. 12, 2016, claiming priority based on Japanese Patent Application Nos. 2015-139543 filed Jul. 13, 2015 and 2015-196510 filed Oct. 2, 2015, the contents of all of which are incorporated herein by reference in their entirety.

TECHNICAL FIELD

The present invention relates to a method and a device for manufacturing a bearing unit.

BACKGROUND ART

Patent Document 1 discloses a bearing unit in which a face spline for power transmission is installed on an end surface of an inner ring. In the related art, a rotating press apparatus (a rotary pressing machine or a rotary forging machine) is used for processing of a face spline.

CITATION LIST

Patent Document

[Patent Document 1]
Japanese Unexamined Patent Application, First Publication No. 2009-292422
[Patent Document 2]
Japanese Unexamined Patent Application, First Publication No. 2002-81453
[Patent Document 3]
PCT International Publication No. 2009/139137

SUMMARY OF INVENTION

Technical Problem

An aspect of the present invention is to provide a method of manufacturing a bearing unit capable of suppressing manufacturing cost while securing durability of a bearing unit.

In addition, another aspect of the present invention is to provide a method for manufacturing a bearing unit and a device for manufacturing a bearing unit capable of reducing an unbalanced load applied to the other portion of a hub main body in the axial direction or causing the unbalanced load to be substantially zero when processing of the other portion of the hub main body in the axial direction (for example, a caulking section or a hub-side face spline).

Solution to Problem

In an aspect of the present invention, a method of manufacturing a bearing unit includes a process of setting a workpiece on a press apparatus; and a process of performing a plastic working on the workpiece. The process of performing the plastic working includes moving some of a plurality of elements, which are disposed side by side in a circumferential direction, in an axial direction and pressing a first region of the workpiece with the moved elements, and moving some of other plurality of elements in the axial direction and pressing a second region of the workpiece with the moved other elements.

In another aspect of the present invention, a device for manufacturing a bearing unit includes a holder on which a workpiece is set; a plurality of elements arranged in a circumferential direction and each movable in an axial direction; and a mechanism having a mode of moving some of the plurality of elements in the axial direction and pressing a first region of the workpiece with the moved elements, and a mode of moving some of other plurality of elements in the axial direction and pressing a second region of the workpiece with the moved other elements.

In the other aspect of the present invention, the bearing unit includes a hub main body and an inner ring.

The hub main body has an one-side inner ring track in an axial direction on an outer circumferential surface of an intermediate section of the hub main body in the axial direction.

In addition, the inner ring has an other-side inner ring track in the axial direction on an outer circumferential surface of the inner ring and is fitted onto a portion of the hub main body that is close to other end of the hub main body in the axial direction.

Then, the inner ring is fixed to the hub main body by pressing other end surface of the inner ring in the axial direction with a caulking section formed by plastically deforming a cylindrical section formed on other end portion of the hub main body in the axial direction outward in a radial direction. In addition, a hub-side face spline that is a concavo-convex section in a circumferential direction is formed on other end surface of the caulking section in the axial direction.

In an example, the bearing unit further includes an outer ring having a plurality of rows of outer ring tracks on an inner circumferential surface, and a plurality of rolling bodies that are respectively disposed between both of the outer ring tracks and both of the inner ring tracks such that the plurality of rolling bodies are rollably installed in each of the rows.

In the example, the method of manufacturing a bearing unit is provided to cause one end surface in the axial direction of the forming punch formed by combining a plurality of punch elements divided in the circumferential direction, which are displaceable in the axial direction and which are not displaceable in the circumferential direction, and having a same number of processing teeth as a number of teeth of the hub-side face spline on one end surface of the forming punch in the axial direction to face the other end surface of the caulking section in the axial direction. In this state, rolls are rotated about the central axis of the hub main body while pressing the other end surface of the forming punch in the axial direction with a pressing surface, formed in a circular shape or a truncated conical shape, of the roll having a central axis that is inclined with respect to the central axis of the hub main body. The hub-side face spline is formed on the other end surface of the caulking section in the axial direction by such a process.

In the example, an inclination angle of the central axis of the roll with respect to the central axis of the hub main body is 15° or more. For example, the inclination angle may be 30° or less. The numerical value is an example, and the present invention is not limited thereto.

In the example, the forming punch is constituted by the punch elements divided into the same number as the number of processing teeth. Specifically, it is assumed that the punch elements are divided to correspond to the processing teeth {divided at a central position of a tooth bottom between the neighboring processing teeth (a central position of the forming punch in the circumferential direction)}, or the punch elements are divided at central positions of tooth tips of the processing teeth.

In the example, in a state in which, among both side edges in the circumferential direction of other end surface of one punch element in the axial direction of the punch elements, a rear side edge that is positioned at a rear side in a rotating direction of the roll which rotates about the central axis of the hub main body is pressed by the pressing surface of the roll, among both side edges in the circumferential direction of the other end surface of the punch element existing next to the one punch element at the front side in the rotating direction of the roll in the axial direction, a rear side edge (i.e., a side edge which is closer to the one punch element) that is positioned at a rear side in the rotating direction of the roll, which rotates about the central axis of the hub main body, is not pressed by the pressing surface of the roll.

In other words, in a state in which the rear side surface among the both side surfaces of the one punch element in the circumferential direction in the rotating direction of the roll about the central axis of the hub main body and a virtual plane including the central axis of the hub main body and the central axis of the roll are on the same plane, a pressing quantity (a pressing quantity of the hub main body in the axial direction) by the pressing surface of the roll is adjusted such that a side edge, which is a side edge closer to the one punch element, of a punch element, that exists in front of the one punch element in the rotating direction of the roll, which rotates about the central axis α of the hub main body, and that is one of the side edge among both side edges of the punch element existing next to the one punch element in the circumferential direction of the other end surface of the punch element existing next to the one punch element in the axial direction, and the pressing surface of the roll are made to stay in contact with or close to each other (i.e., the other end surface of the punch element existing in front of the one punch element in the rotating direction of the roll is not strongly pressed by the pressing surface).

In the example, in a state in which a tooth depth of the tooth that constitutes the hub-side face spline formed on the other end surface of the caulking section in the axial direction reaches a desired size the punch elements are prevented from being further displaced toward the other side in the axial direction by abutting a portion of each of the punch element to a step surface section formed on a portion that holds each of the punch elements.

In another aspect of the present invention, the bearing unit presses the other end surface of the inner ring in the axial direction with a caulking section formed by plastically deforming a cylindrical section, formed on other end portion of a hub main body in the axial direction, outward in a radial direction in order to apply a coupling force, which is directed toward one side of the hub main body in the axial direction, to an inner ring fitted onto the hub main body.

In the example, the bearing unit includes a hub main body having an one-side inner ring track in the axial direction on an outer circumferential surface of an intermediate section of the hub main body in the axial direction and an inner ring having an other-side inner ring track in the axial direction on the outer circumferential surface of the inner ring and fitted onto a portion of the hub main body that is close to other end of the hub main body in the axial direction. The inner ring is fixed to the hub main body by pressing the other end surface of the inner ring in the axial direction with the caulking section formed by plastically deforming the cylindrical section formed on the other portion of the hub main body in the axial direction outward in the radial direction. Further, the bearing unit includes an outer ring having a plurality of rows of outer ring tracks on an inner circumferential surface, and a plurality of rolling bodies that are respectively disposed between both of the outer ring tracks and both of the inner ring tracks such that a plurality of rolling bodies are rollably installed in each of the rows.

In the example, a method of manufacturing a bearing unit is provided to cause one end surface of a forming die for forming a caulking section, formed by combining a plurality of forming die elements that are disposed side by side in the circumferential direction about the central axis of the hub main body and that are arranged to be displaceable in the axial direction independently with each other, in an axial direction (one end surfaces of each of forming die elements in the axial direction) to abut the other end surface of the cylindrical section in the axial direction. Along with this, a plurality of rollers disposed at a plurality of places that are fewer than the total number of forming die elements in the circumferential direction about the central axis of the hub main body are rollably pressed against the other end surface of the forming die for forming a caulking section in the axial direction (i.e., the other end surfaces in the axial direction of some of the forming die element of the forming die elements facing the rollers). Then, in this state, the cylindrical section is processed into the caulking section by rolling the rollers in the circumferential direction about the central axis of the hub main body (i.e., sequentially pressing the rollers against the other end surfaces of the forming die elements in the axial direction, and sequentially pressing one end surfaces of the forming die elements in the axial direction against the other end surface of the cylindrical section in the axial direction).

In the example, a hub-side face spline that is a concavo-convex section in the circumferential direction is formed on the other end surface of the caulking section in the axial direction.

For this reason, one end surface of a forming die for forming a face spline in the axial direction formed by combining a plurality of forming die elements disposed side by side in the circumferential direction about the central axis of the hub main body and displaceable in the axial direction independently with each other (i.e., a surface having the same number of processing teeth as the number of teeth of the hub-side face spline, or one end surfaces of the forming die elements in the axial direction) abuts the other end surface of the caulking section in the axial direction. Along with this, a plurality of rollers disposed at a plurality of places that are fewer than the total number of the forming die elements in the circumferential direction about the central axis of the hub main body are rollably pressed against the other end surface of the forming die for forming a face spline in the axial direction (i.e., the other end surfaces of some of the forming die elements in the axial direction of the forming die elements facing the rollers). Then, in this state, the hub-side face spline is formed on the other end surface of the caulking section in the axial direction by rolling the rollers in the circumferential direction about the central axis of the hub main body (i.e., by sequentially pressing the rollers against the other end surfaces of the forming die elements in the axial direction, and sequentially pressing one end surfaces of the forming die elements in the axial direction against the other end surface of the caulking section in the axial direction).

In the example, the hub-side face spline may be formed after forming the caulking section.

In the example, each of the rollers is disposed on a circumference about the central axis of the hub main body with a rotationally symmetrical positional relation about the central axis of the hub main body (for example, at equal intervals in the circumferential direction).

Further, the rotational symmetry means a disposition in which, provided that m is an integer of 2 or more, when a certain positional relation is rotated about a certain axis $(360/m)°$, the rotated positional relation is equal to the positional relation before rotation (such a positional relation is referred to as a positional relation of m-fold symmetry). For example, a positional relation of m places at equal intervals in the circumferential direction on a circumference about a certain axis is a positional relation of m-fold symmetry.

In the example, the device for manufacturing a bearing unit includes a forming die for a caulking section, a pressing unit, and a driving mechanism for a pressing unit.

The forming die for a caulking section is configured by combining a plurality of forming die elements disposed side by side in the circumferential direction about the central axis of the hub main body and displaceable in the axial direction independently with each other, and can cause one end surface in the axial direction (one end surfaces of the forming die elements in the axial direction) of the forming die for forming a caulking section to abut the other end surface of the cylindrical section of the hub main body in the axial direction.

The pressing unit includes a plurality of rollers disposed at a plurality of places that are fewer than the total number of forming die elements in the circumferential direction about the central axis of the hub main body and can cause the rollers to rollably abut the other end surface of the forming die for forming a caulking section in the axial direction.

The driving mechanism for a pressing unit can apply a driving force for rolling each of the rollers in the circumferential direction about the central axis of the hub main body to the pressing unit in a state in which one end surface of the forming die for forming a caulking section in the axial direction abuts the other end surface of the cylindrical section in the axial direction, and the rollers are rollably pressed against the other end surface of the forming die for forming a caulking section in the axial direction.

In the example, the device for manufacturing a bearing unit includes a forming die for forming a face spline, a pressing unit, and a driving mechanism for a pressing unit.

The forming die for forming a face spline is formed by combining a plurality of forming die elements disposed side by side in the circumferential direction about the central axis of the hub main body and displaceable in the axial direction independently with each other, and can cause one end surface in the axial direction (i.e., a surface having the same number of processing teeth as the number of teeth of the hub-side face spline or one end surfaces of the forming die elements in the axial direction) of the forming die for forming a face spline to abut the other end surface of the caulking section in the axial direction.

The pressing unit includes a plurality of rollers disposed at a plurality of places that are fewer than the total number of forming die elements in the circumferential direction about the central axis of the hub main body and can cause the rollers to rollably abut the other end surface of the forming die for forming a face spline in the axial direction.

The driving mechanism for a pressing unit can apply a driving force for rolling each of the rollers in the circumferential direction about the central axis of the hub main body to the pressing unit in a state in which one end surface of the forming die for forming a face spline in the axial direction abuts the other end surface of the caulking section in the axial direction, and the rollers are rollably pressed against the other end surface of the forming die for forming a face spline in the axial direction.

For example, the forming die for a face spline can be formed from the forming die elements divided into the same number as the number of processing teeth. Specifically, it is assumed that the forming die elements are divided to correspond to the processing teeth {divided at a central position of a tooth bottom between the neighboring processing teeth (for example, a central position of the forming die for a face spline in the circumferential direction)}, or the forming die elements are divided at central positions of tooth tips of the processing teeth.

In the example, each of the rollers is disposed on a circumference about the central axis of the hub main body with a rotationally symmetrical positional relation to the central axis of the hub main body (for example, at equal intervals in the circumferential direction).

Advantageous Effects of Invention

According to the aspect of the present invention, manufacturing cost can be suppressed while durability of the bearing unit is secured.

In addition, according to the aspect of the present invention, when processing on the other portion of the hub main body in the axial direction (for example, the caulking section or the hub-side face spline) is performed, an unbalanced load applied to the other portion of the hub main body in the axial direction can be reduced or can be substantially zero.

BRIEF DESCRIPTION OF DRAWINGS

FIG. 9 is a cross-sectional view showing an example of a wheel-driving bearing unit.

DESCRIPTION OF EMBODIMENTS

Figure 1:
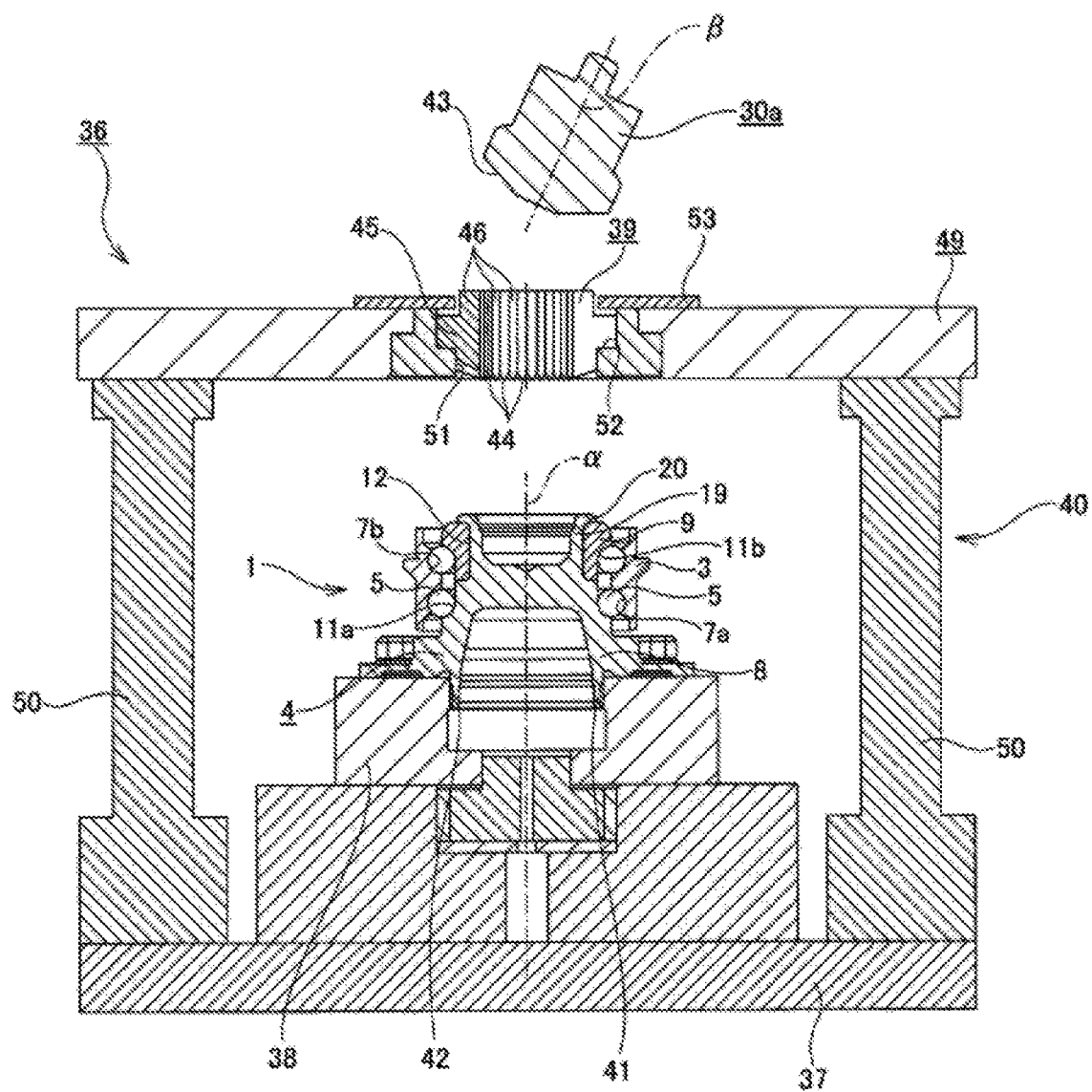
FIG. 1 is a cross-sectional view showing an example of a rotating press apparatus that can perform a manufacturing method of a first embodiment of the present invention in a state before starting a processing of forming a hub-side face spline.

FIG. 9 shows a wheel-driving bearing unit disclosed in Patent Document 1. The unit is a kind of a bearing unit serving as a target of the present invention, and has a structure in which a rolling bearing unit configured to support a wheel is incorporated. The wheel-driving bearing unit shown in FIG. 9 is formed by combining a wheel-supporting rolling bearing unit 1 and an outer ring 2 for a constant velocity joint. The wheel-supporting rolling bearing unit 1 includes an outer ring 3, a hub 4, and a plurality of rolling elements (in the example shown, balls) 5 and 5.

The outer ring 3 has a standstill-side flange 6 on an outer circumferential surface thereof, and a plurality of rows of outer ring tracks 7a and 7b on an inner circumferential surface thereof.

The hub 4 is formed by combining a hub main body 8 and an inner ring 9. The hub main body 8 has a rotation-side flange 10 formed at a portion close to one side of an outer circumferential surface in an axial direction. In addition, the hub main body 8 has an inner ring track 11a formed on an intermediate section of the outer circumferential surface in the axial direction at one side in the axial direction. In addition, the hub main body 8 has a small diameter step section 12 on the other portion of the outer circumferential surface in axial direction, and a center hole 13 in a central section.

Further, "one side" in the axial direction refers to an outside of a vehicle in a widthwise direction in a state in which a bearing unit is assembled in an automobile. That is, a left side in FIG. 9 and a lower side in FIGS. 1 to 4A, 6A and 6B are referred to as "one side" in the axial direction, and on the other hand, a right side in FIG. 9 and an upper side in FIGS. 1 to 4A, 6A and 6B that are a central side of a vehicle in a state in which the bearing unit is assembled in an automobile are referred to as "the other side" in the axial direction.

A small diameter section 14 through which a rod section 16 of a bolt 15 serving as a coupling member is inserted via a predetermined guide gap is formed on one side portion of the center hole 13 in the axial direction.

The inner ring 9 has an inner ring track 11b formed in the outer circumferential surface on the other side in the axial direction, and is fastened and fitted onto the small diameter step section 12 of the hub main body 8.

The rolling elements 5 and 5 are installed between both of the outer ring tracks 7a and 7b and both of the inner ring tracks 11a and 11b such that the plurality of rolling elements are rollable in both rows.

In this state, a caulking section 20 is formed by plastically deforming a portion of a cylindrical section 19, formed on the other portion of the hub main body 8 in the axial direction, protruding from the other end opening of the inner ring 9 in the axial direction outward in the radial direction. An appropriate preload is applied to the rolling elements 5 and 5 by pressing down the other end surface of the inner ring 9 in the axial direction using the caulking section 20.

A hub-side face spline 21 that is a concavo-convex section in a circumferential direction is formed on the other end surface of the caulking section 20 in the axial direction throughout the circumference.

Further, in the case of the example shown, a tooth tip surface of the hub-side face spline 21 is a plane perpendicular to a central axis of the hub main body 8.

The outer ring 2 for a constant velocity joint has a cup-shaped mouth section 22, an end wall section 23 that is a bottom section of the mouth section 22, and a cylindrical shaft section 24 extending from a central section of the end wall section 23 toward one side in the axial direction. A center hole of the shaft section 24 is a screw hole 25.

A joint-side face spline 26 that is a concavo-convex section in the circumferential direction is formed on a portion closer to an outer circumference of one end surface of the end wall section 23 in the axial direction throughout the circumference.

Further, in the case of the example shown, a tooth tip surface of the joint-side face spline 26 is a plane perpendicular to the central axis of the outer ring 2 for a constant velocity joint. In addition, the number of teeth of the joint-side face spline 26 is the same as the number of teeth of the hub-side face spline 21.

Then, in a state in which central axes of the hub main body 8 and the outer ring 2 for a constant velocity joint coincide with each other, transmission of a rotating force between the hub main body 8 and the outer ring 2 for a constant velocity joint becomes possible by making the hub-side and joint-side face splines 21 and 26 mesh with each other. In addition, in this state, a male screw section 17 formed on a tip portion of the rod section 16 is screwed into the screw hole 25 and further fastened thereinto while the rod section 16 of the bolt 15 is inserted through the small diameter section 14 of the center hole 13 of the hub main body 8 from one side in the axial direction. Accordingly, in a state in which the hub main body 8 is disposed between a head portion 18 of the bolt 15 and the outer ring 2 for a constant velocity joint, the hub main body 8 and the outer ring 2 for a constant velocity joint are coupled and fixed.

When the wheel-driving bearing unit configured as above is assembled in the vehicle, a rotary member for braking such as a wheel (a driving wheel), a disk, and so on are supported by and fixed to the rotation-side flange 10 of the hub main body 8 while the standstill-side flange 6 of the outer ring 3 is coupled and fixed to a suspension system. In addition, a tip portion of a drive shaft (not shown) rotated and driven by an engine via a transmission is spline-coupled to an inside of an inner ring 27 for a constant velocity joint installed inside the outer ring 2 for a constant velocity joint. During traveling of an automobile, rotation of the inner ring 27 for a constant velocity joint is transmitted to the outer ring 2 for a constant velocity joint and the hub main body 8 via a plurality of balls 28 to rotate and drive the wheel.

When the wheel-supporting rolling bearing unit 1 that constitutes the wheel-driving bearing unit configured as above is assembled, first, the outer ring 3 is disposed around the hub main body 8, and the rolling elements 5 and 5 are installed between the outer ring track 7a at one side in the axial direction among the outer ring tracks 7a and 7b and the inner ring track 11a at the one side in the axial direction while being held by a holder 29a at one side in the axial direction. Next, the rolling elements 5 and 5 are installed around the inner ring track 11b of the other side in the axial direction formed on the outer circumferential surface of the inner ring 9 while being held by a holder 29b of the other side in the axial direction, and in this state, the inner ring 9 is fastened and fitted onto the small diameter step section 12 formed on the other end portion of the hub main body 8 in the axial direction. Then, according to the on-fitting work, rolling surfaces of the rolling elements 5 and 5 held by the holder 29b of the other side in the axial direction (for example, the rolling elements 5 and 5 installed in the other side row in the axial direction) abut the outer ring track 7b at the other side in the axial direction formed on an inner circumferential surface of a portion close to the other end of the outer ring 3 in the axial direction. Next, the cylindrical section 19 formed on the other portion of the hub main body 8 in the axial direction is plastically deformed outward in the radial direction to form the caulking section 20. Then, the inner ring 9 is fixed to the hub main body 8 by pressing the other end surface of the inner ring 9 in the axial direction down in the axial direction using the caulking section 20.

Figure 10:
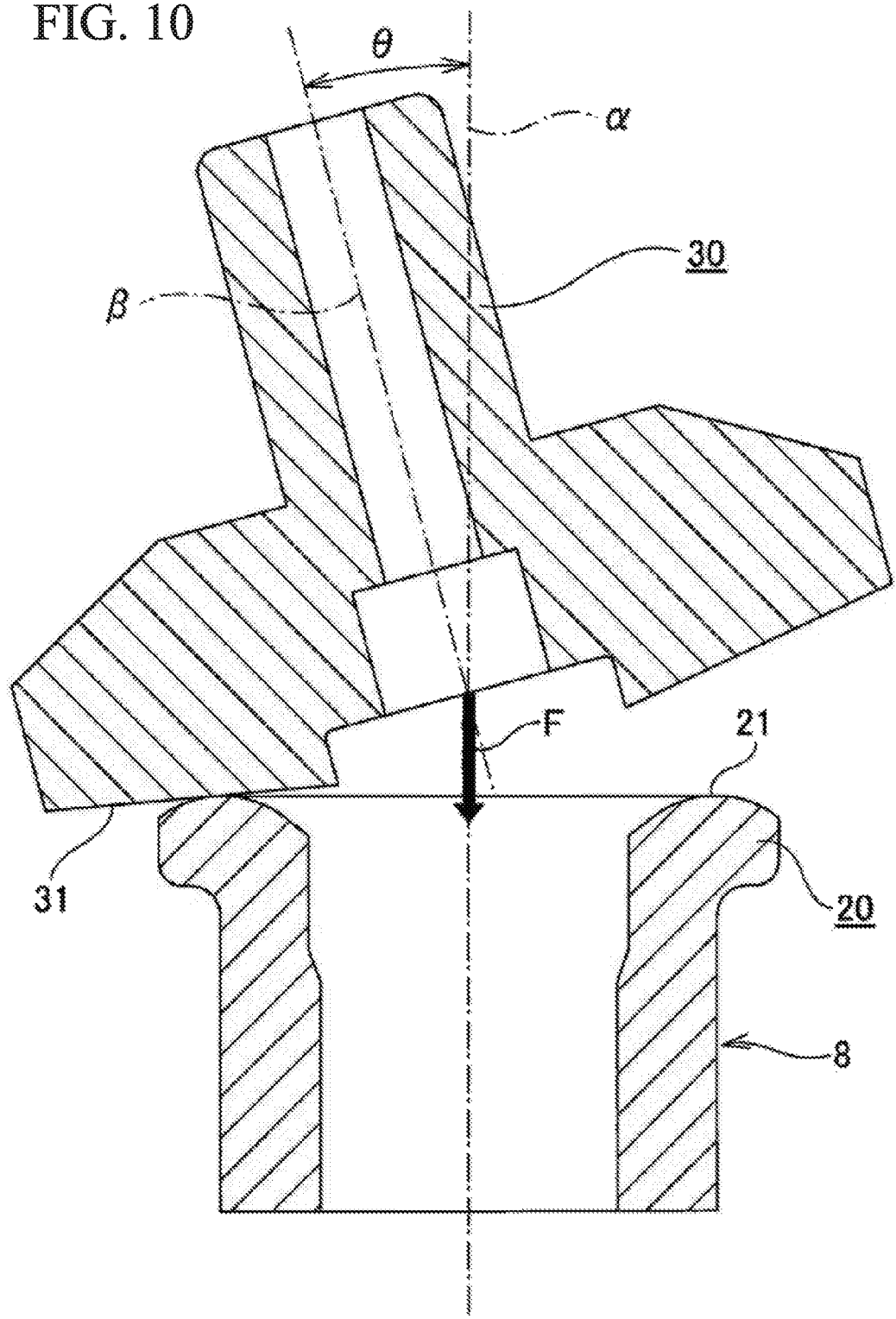
FIG. 10 is a cross-sectional view showing an example of a method of manufacturing a wheel-driving bearing unit.

Further, as shown in FIG. 10, the hub-side face spline 21 is formed on the other end surface of the caulking section 20 in the axial direction by performing rotary forging using a roll 30 having a central axis β inclined with respect to a central axis of the hub main body 8 (a central axis of the wheel-supporting rolling bearing unit 1) α by a predetermined angle θ.

Further, in FIG. 10, members other than the hub main body 8 (the outer ring 3, the rolling elements 5 and 5, the inner ring 9, and so on) among members that constitute the wheel-supporting rolling bearing unit 1 are omitted. A tip surface (a lower end surface of FIG. 10) of the roll 30 forms a processing surface 31 in which convex sections 33 and 33 (processing teeth) and a concave section 34 (see FIG. 12) are alternately disposed through the circumference thereof. In a state in which the processing surface 31 of the roll 30 is pressed against the other end surface of the caulking section 20 in the axial direction, the roll 30 is rotated about the central axis α of the hub main body 8. FIG. 12 is a schematic view showing a state in which the hub-side face spline is formed by rotary forging.

Here, the roll 30 is rotatably supported about a central axis β thereof. Accordingly, in a state before the hub-side face spline 21 (i.e., a concavo-convex section in the circumferential direction to be the hub-side face spline 21) is formed on the other end surface of the caulking section 20 in the axial direction, when the roll 30 is rotated about the central axis α of the hub main body 8, the roll 30 is rotated (self rotation) about the central axis β thereof on the basis of frictional engagement between tip surfaces of the convex sections 33 and 33 formed on the processing surface 31 and the other end surface of the caulking section 20 in the axial direction. Meanwhile, after the hub-side face spline 21 is formed to a certain extent (for example, once a tooth depth of the hub-side face spline 21 has grown to a certain extent), when the roll 30 is rotated about the central axis α of the hub main body 8, the roll 30 self rotates on the basis of engagement (meshing) between the concave section 34 and the convex sections 33 and 33, that constitute the processing surface 31, and the hub-side face spline 21. According to the above-mentioned configuration, when the other end surface of the caulking section 20 in the axial direction is plastically deformed, the hub-side face spline 21 is formed on the other end surface of the caulking section 20 in the axial direction, and further, a tooth depth of the hub-side face spline 21 is increased to complete the processing.

A method of manufacturing the above-mentioned wheel-supporting rolling bearing unit 1 has room for improvement in the aspect of suppressing manufacturing cost while securing durability of the wheel-supporting rolling bearing unit 1. That is, work of forming the hub-side face spline 21 (rotary forging) is performed by rotating the roll 30 about the central axis α of the hub main body 8 in a state in which the processing surface 31 of the roll 30 is pressed against the other end surface of the caulking section 20 in the axial direction with a large force (a pressing force) F.

During such rotary forging, when an inclined angle θ of the central axis β of the roll 30 with respect to the central axis α of the hub main body 8 is small, an abutting area between the processing surface 31 of the roll 30 and the other end surface of the caulking section 20 in the axial direction, i.e., an abutting area between the tip surfaces of the convex sections 33 and 33 that constitute the processing surface 31 and the other end surface of the caulking section 20 in the axial direction, is increased.

As a result, a load (for example, an abutting surface pressure between the tip surfaces of the convex sections 33 and 33 and the other end surface of the caulking section 20 in the axial direction) applied from the tip surfaces of the convex sections 33 and 33 to the other end surface of the caulking section 20 in the axial direction (for example, a portion of the other end surface of the caulking section 20 in the axial direction to be a tooth bottom of the hub-side face spline 21) is reduced.

Accordingly, when the inclined angle θ is small, the pressing force F is increased, and a load applied from the tip surfaces of the convex sections 33 and 33 to the other end surface of the caulking section 20 in the axial direction should be secured.

Figure 11:
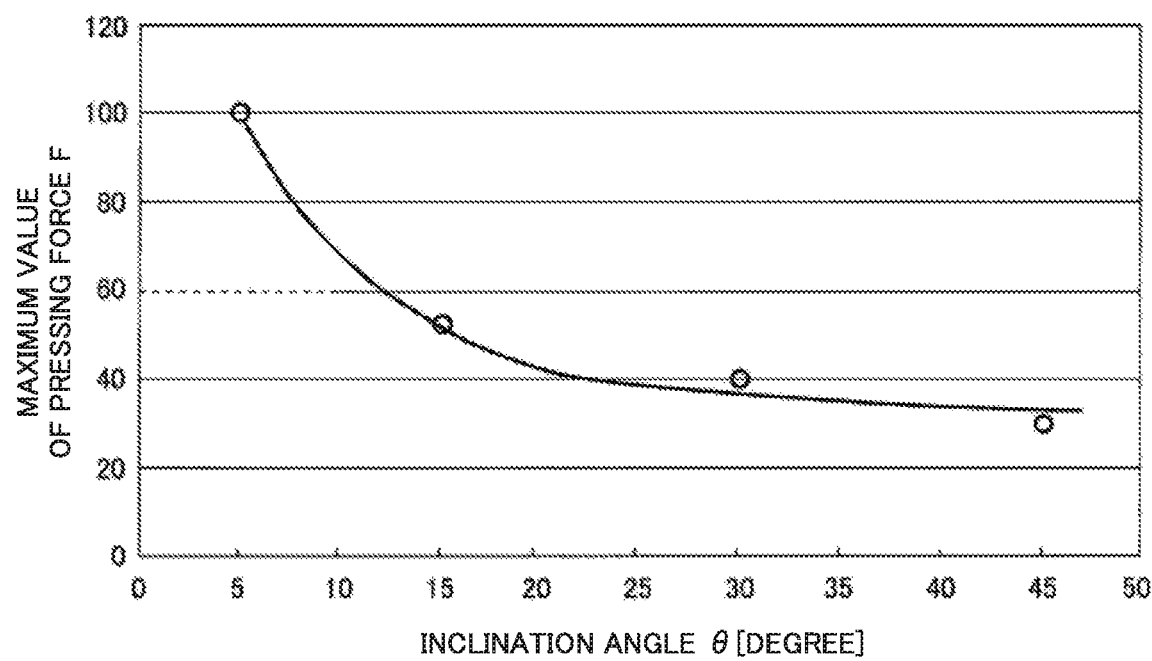
FIG. 11 is a diagram showing a relation between an inclination angle of a central axis of a roll with respect to a central axis of a hub main body and a maximum value of a pressing force.

FIG. 11 shows a relation between the inclined angle θ and a maximum value of the pressing force F. As will be apparent from FIG. 11, when the inclined angle θ is 5°, the pressing force F needs to have a value that is twice that when the inclined angle θ is 15°. When the pressing force F is increased, a processing apparatus using the rotary forging is increased in size, and thus manufacturing cost is increased.

Figure 12A:
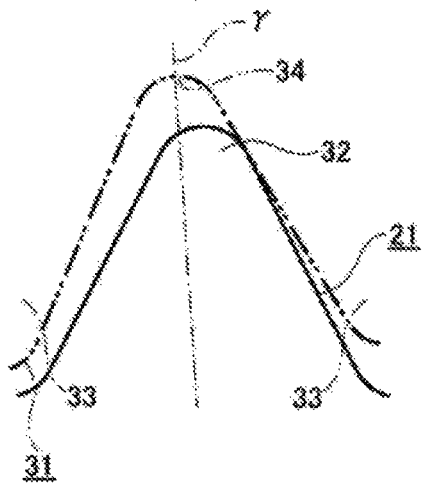
FIGS. 12(A)-12(E) are views showing a state in which a hub-side face spline is formed by rotary forging.
Figure 12B:
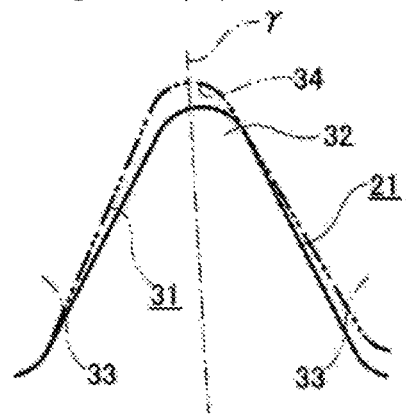
Figure 12C:
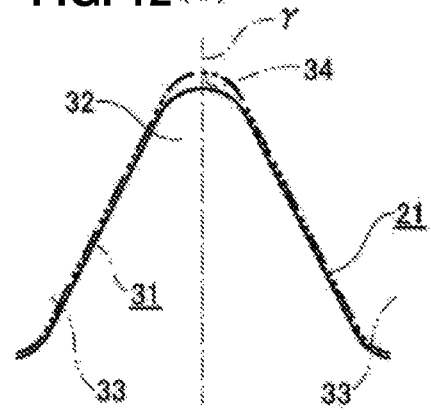
Figure 12D:
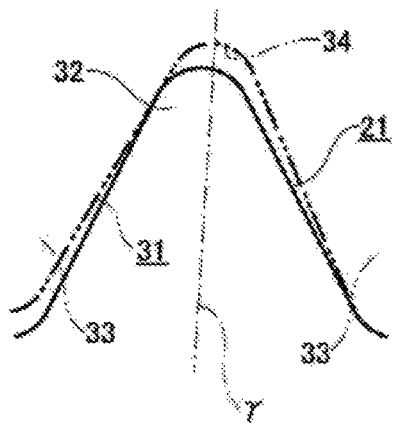
Figure 12E:
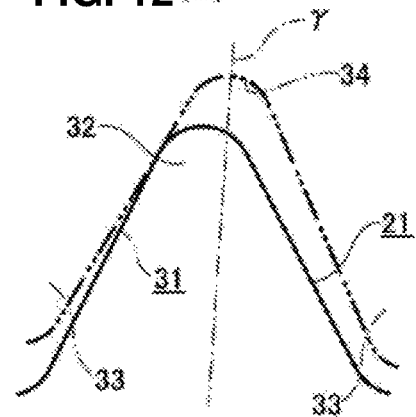

Meanwhile, when the inclination angle θ is increased, straightness of a cross-sectional shape of a tooth surface of a tooth 32 (a side surface of a tooth) that constitutes the hub-side face spline 21 is decreased. That is, in the case of the method of manufacturing the above-mentioned wheel-supporting rolling bearing unit 1, in a state in which a central position of one concave section 34 (a central position of the roll 30 in a circumferential direction) among the plurality of concave sections 34 that constitute the processing surface 31 of the roll 30 is pressed against the other end surface of the caulking section 20 in the axial direction (a state in which a virtual line γ parallel to the central axis β of the roll 30 is in a virtual plane including the central axis α and the central axis β of the hub main body 8 passing through the central position of the one concave section 34), the tooth surface of the tooth 32 formed by the one concave section 34 (i.e., a side surface of a convex section in the circumferential direction to be the tooth 32) becomes parallel to an inner side surface of the one concave section 34 (a side surface of the roll 30 in the circumferential direction) when abutting the tooth surface of the tooth 32 as shown in FIG. 12(C).

From this state, when the roll 30 is rotated (revolved) about the central axis α, the inner side surface of the one concave section 34 is inclined with respect to the tooth surface of the tooth 32 formed by the one concave section 34 (i.e., a side surface of a convex section in the circumferential direction that will become the tooth 32). An inclination angle of the side surface of the one concave section 34 in the circumferential direction with respect to the tooth surface of the tooth 32 is maximized in a state in which a central position of the one convex section 33 among the plurality of convex sections 33 and 33 that constitute the processing surface 31 of the roll 30 is pressed against the other end surface of the caulking section 20 in the axial direction {a state shown in FIG. 12(B) or 12(D)}. An inclination angle of the inner side surface of the concave section 34 with respect to the tooth surface of the tooth 32 is increased as the inclination angle θ of the central axis β of the roll 30 with respect to the central axis α of the hub main body 8 is increased. Then, when the inclination angle of the inner side surface of the concave section 34 with respect to the tooth surface of the tooth 32 is increased, the side surface of the one concave section 34 in the circumferential direction locally abuts the tooth surface of the tooth 32, and the tooth surface of the tooth 32 is locally plastically deformed.

Figure 13A:
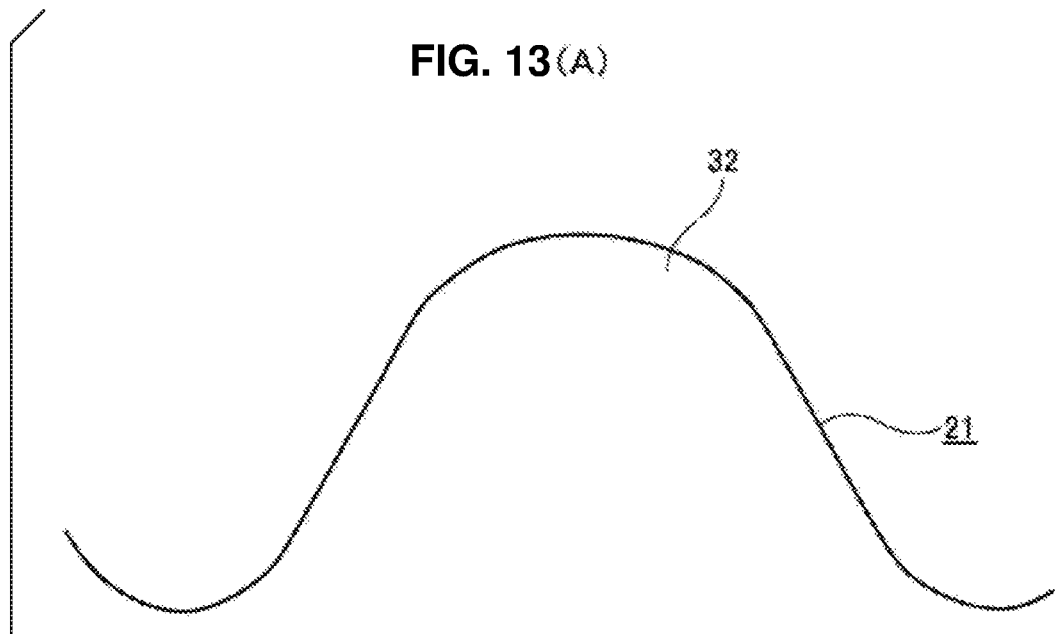
FIGS. 13(a)-13(B) are schematic views showing face spline teeth formed by rotary forging.
Figure 13B:
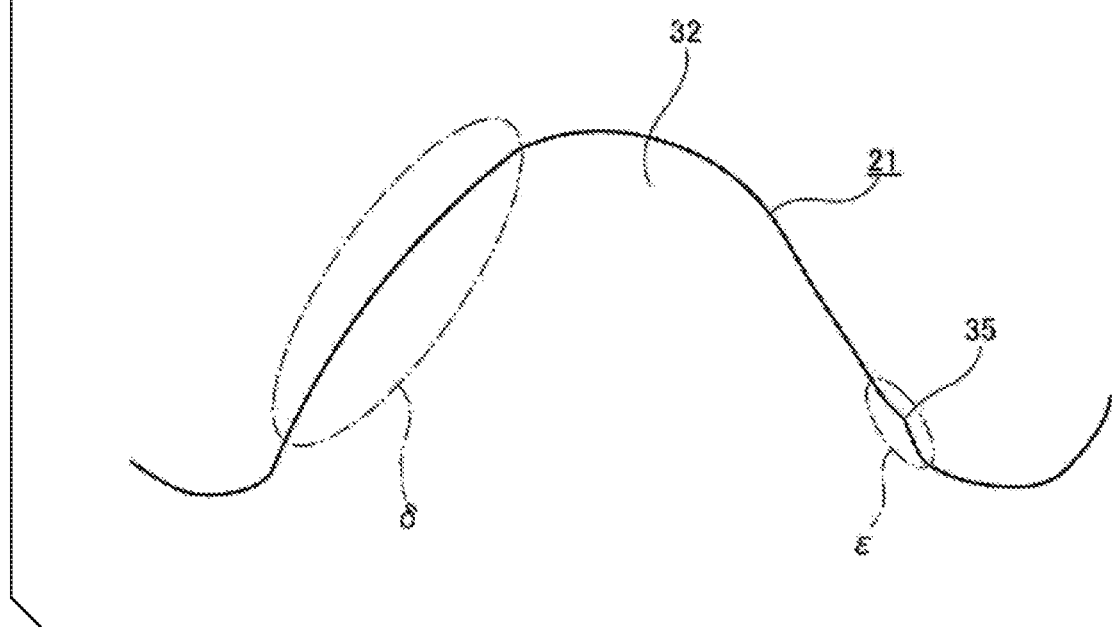

FIG. 13 is a schematic view showing face spline teeth formed by rotary forging, FIG. 13(A) is a schematic view when an inclination angle of the central axis of the roll with respect to the central axis of the hub main body is 5°, and FIG. 13(B) is a schematic view when an inclination angle of the central axis of the roll with respect to the central axis of the hub main body is 15°. As a result of the local plastic deformation of the tooth surface of the tooth 32 described above, like a portion surrounded by a chain line δ in FIG. 13(B), a radius of curvature of a cross-sectional shape of the tooth surface of the tooth 32 is reduced, and like a portion surrounded by a chain line ε, a step section 35 is formed, and straightness of the cross-sectional shape of the tooth surface of the tooth 32 is decreased. When the straightness is decreased, in a state in which the hub-side face spline 21 is meshed with the joint-side face spline 26 (see FIG. 9) formed on the outer ring 2 for a constant velocity joint, an abutting area between tooth surfaces of the teeth 32 that constitute the hub-side face spline 21 and the teeth that constitute the joint-side face spline 26 is reduced, and it may be difficult to secure durability of the meshing section between the hub-side face spline 21 and the joint-side face spline 26, and further, the wheel-supporting rolling bearing unit 1 as a whole.

Figure 27:
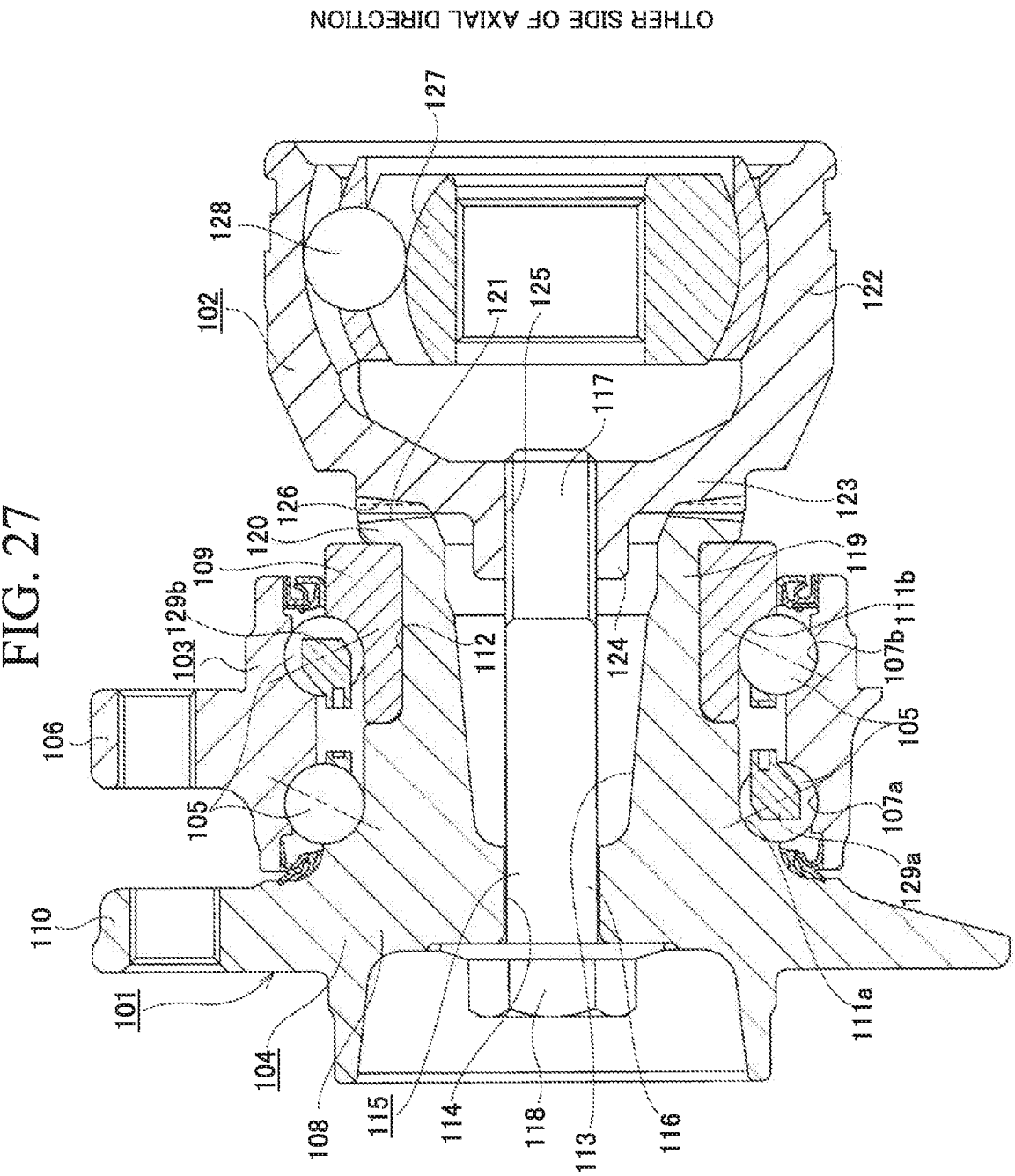
FIG. 27 is a cross-sectional view showing an example of a wheel-driving bearing unit.

FIG. 27 shows a wheel-driving bearing unit disclosed in Patent Document 1. The unit is a kind of a bearing unit serving as a target of the present invention, and has a structure in which a rolling bearing unit configured to support a wheel is incorporated.

The wheel-driving bearing unit shown in FIG. 27 is formed by combining a wheel-supporting rolling bearing unit 101 and an outer ring 102 for a constant velocity joint.

The wheel-supporting rolling bearing unit 101 includes an outer ring 103, a hub 104, and a plurality of rolling elements (in the example shown, balls) 105 and 105.

The outer ring 103 has a standstill-side flange 106 on an outer circumferential surface thereof, and a plurality of rows of outer ring tracks 107a and 107b on an inner circumferential surface thereof.

The hub 104 is formed by combining a hub main body 108 and an inner ring 109. The hub main body 108 has a rotation-side flange 110 formed on a portion of the outer circumferential surface close to one side in the axial direction. In addition, the hub main body 108 has an inner ring track 111a formed on an intermediate section of the outer circumferential surface in the axial direction at one side in the axial direction. In addition, the hub main body 108 has a small diameter step section 112 formed on the other portion of the outer circumferential surface in the axial direction, and a center hole 113 in the axial direction formed in a central section in the radial direction. A small diameter section 114 through which a rod section 116 of a bolt 115 serving as a coupling member can be inserted via a predetermined guide gap is present in one side portion of the center hole 113 in the axial direction.

Further, "one side" in the axial direction refers to an outside of a vehicle in a widthwise direction in a state in which a bearing unit is assembled in an automobile. That is, a left side in FIG. 27 and a lower side in FIGS. 14, 16 to 18 and 21 to 24 are referred to as "one side" in the axial direction, and on the other hand, a right side in FIG. 27 and an upper side in FIGS. 14, 16 to 18 and 21 to 24 that are a central side of a vehicle in a state in which the bearing unit is assembled in an automobile are referred to as "the other side" in the axial direction.

The inner ring 109 has an inner ring track 111b formed in the outer circumferential surface on the other side in the axial direction, and is fastened and fitted onto the small diameter step section 112 of the hub main body 108.

The rolling elements 105 and 105 are installed between both of the outer ring tracks 107a and 107b and both of the inner ring tracks 111a and 111b such that a plurality of rolling elements are rollable in both rows.

In this state, a caulking section 120 is formed by plastically deforming a portion of a cylindrical section 119 formed on the other portion of the hub main body 108 in the axial direction protruding from the other end opening of the inner ring 109 in the axial direction outward in the radial direction. Separation of the inner ring 109 from the hub main body 108 is prevented while an appropriate preload is applied to the rolling elements 105 and 105 by pressing down the other end surface of the inner ring 109 in the axial direction using the caulking section 120 (i.e., a coupling force with respect to the hub main body 108 toward one side in the axial direction is applied to the inner ring 109).

A hub-side face spline 121 that is a concavo-convex section in the circumferential direction is formed on the other end surface of the caulking section 120 in the axial direction throughout the circumference.

Further, in the case of the example shown, a tooth tip surface of the hub-side face spline 121 is a plane perpendicular to a central axis of the hub main body 108.

The outer ring 102 for a constant velocity joint has a cup-shaped mouth section 122, an end wall section 123 that is a bottom section of the mouth section 122, and a cylindrical shaft section 124 extending from a central section of the end wall section 123 toward one side in the axial direction. A center hole of the shaft section 124 is a screw hole 125.

A joint-side face spline 126 that is a concavo-convex section in the circumferential direction is formed on a portion close to an outer circumference of one end surface of the end wall section 123 in the axial direction throughout the circumference.

Further, in the case of the example shown, a tooth tip surface of the joint-side face spline 126 is a plane perpendicular to the central axis of the outer ring 102 for a constant velocity joint. In addition, the number of teeth of the joint-side face spline 126 is equal to the number of teeth of the hub-side face spline 121.

Then, in a state in which central axes of the hub main body 108 and the outer ring 102 for a constant velocity joint coincide with each other, transmission of a rotating force between the hub main body 108 and the outer ring 102 for a constant velocity joint becomes possible by meshing both of the hub-side and joint-side face splines 121 and 126. In addition, in this state, the rod section 116 of the bolt 115 is inserted through the small diameter section 114 of the center hole 113 of the hub main body 108 from one side in the axial direction, and a male screw section 117 formed on the tip portion of the rod section 116 is screwed into the screw hole 125 to be further fastened. Accordingly, in a state in which the hub main body 108 is disposed between a head portion 118 of the bolt 115 and the outer ring 102 for a constant velocity joint, the hub main body 108 and the outer ring 102 for a constant velocity joint are coupled and fixed to each other.

When the wheel-driving bearing unit configured as above is assembled to the vehicle, the standstill-side flange 106 of the outer ring 103 is coupled and fixed to a suspension system, and supports and fixes a rotary member for braking such as a wheel (a driving wheel), a disk, and so on to the rotation-side flange 110 of the hub main body 108. In addition, a tip portion of a drive shaft (not shown) rotated and driven by an engine via a transmission is spline-coupled to an inside of an inner ring 127 for a constant velocity joint formed inside the outer ring 102 for a constant velocity joint. During traveling of an automobile, rotation of the inner ring 127 for a constant velocity joint is transmitted to the outer ring 102 for a constant velocity joint and the hub main body 108 via a plurality of balls 128, and the wheel is rotated and driven.

When the wheel-supporting rolling bearing unit 101 that constitutes the above-mentioned wheel-driving bearing unit is assembled, first, the outer ring 103 is disposed around the hub main body 108, and the rolling elements 105 and 105 are installed between the outer ring track 107a at one side in the axial direction, among both of the outer ring tracks 107a and 107b, and the inner ring track 111a at one side in the axial direction while being held by a holder 129a at one side in the axial direction. Next, the rolling elements 105 and 105 are disposed around the inner ring track 111b of the other side in the axial direction formed on the outer circumferential surface of the inner ring 109 while being held by a holder 129b at the other side in the axial direction, and in this state, the inner ring 109 is fastened and fitted onto the small diameter step section 112 formed on the other portion of the hub main body 108 in the axial direction. Then, according to the on-fitting work, rolling surfaces of the rolling elements 105 and 105 held by the holder 129b at the other side in the axial direction (for example, the rolling elements 105 and 105 installed in the other side row in the axial direction) are made to abut the outer ring track 107b at the other side in the axial direction formed on the inner circumferential surface of the portion close to the other end of the outer ring 103 in the axial direction. Next, the caulking section 120 is formed by plastically deforming the cylindrical section 119 formed on the other portion of the hub main body 108 in the axial direction outward in the radial direction. Along with this, the hub-side face spline 121 is formed on the other end surface of the caulking section 120 in the axial direction.

The caulking section 120 or the hub-side face spline 121 can be formed with a relatively small processing force by performing rotary forging of rotating (self rotation) the roll about the central axis thereof while rotating (revolving) the roll about the central axis of the hub main body 108 in a state in which a processing surface of the roll having the central axis inclined with respect to the central axis of the hub main body 108 by a predetermined angle is pressed against the other end surface of the hub main body 108 in the axial direction (for example, see Patent Documents 2 and 3).

However, when the above-mentioned rotary forging is performed, a load applied from the processing surface of the roll toward the other portion of the hub main body 108 in the axial direction is a load in one place in the circumferential direction. That is, when the above-mentioned rotary forging is performed, a large unbalanced load (for example, a load applied to a position offset from the central axis of the hub main body 108 in the radial direction) is applied from the processing surface of the roll to the other portion of the hub main body 108 in the axial direction. For this reason, after formation of the caulking section 120 or the hub-side face spline 121, a force pressing the other end surface of the inner ring 109 in the axial direction using the caulking section 120 may be irregular in the circumferential direction.

First Embodiment

A first embodiment of the present invention will be described with reference to FIGS. 1 to 7. Further, in the embodiment, a method of forming a hub-side face spline on the other end surface of a caulking section in an axial direction of a hub main body that constitutes a rolling bearing unit to suppress manufacturing cost while securing durability of a wheel-supporting rolling bearing unit 1 will be described. Since a sequence or the like of manufacturing members that constitute the wheel-supporting rolling bearing unit 1 by performing plastic working such as forging or the like, cutting such as lathe turning or the like, and finishing such as polishing or the like on a metal material is the same as in the method of manufacturing a rolling bearing unit widely known in the related art, description thereof will be omitted.

Even in the case of the embodiment, like the above-mentioned manufacturing method, the outer ring 3 is disposed around the hub main body 8, and the plurality of rolling elements 5 and 5 are installed between the outer ring track 7*a* at one side in the axial direction and the inner ring track 11*a* at one side in the axial direction while being held by the holder 29*a* (see FIG. 9) at one side in the axial direction. Next, the rolling elements 5 and 5 are installed around the inner ring track 11*b* at the other side in the axial direction formed on the outer circumferential surface of the inner ring 9 while being held by the holder 29*b* at the other side in the axial direction. In this state, the inner ring 9 is fastened and fitted onto the small diameter step section 12 formed on the other portion of the hub main body 8 in the axial direction.

Then, according to the on-fitting work, the rolling surfaces of the rolling elements 5 and 5 of the other side row in the axial direction are made to abut the outer ring track 7*b* at the other side in the axial direction formed on the inner circumferential surface of the portion close to the other end of the outer ring 3 in the axial direction. Next, the caulking section 20 is formed by plastically deforming the cylindrical section 19 formed on the other portion of the hub main body 8 in the axial direction outward in the radial direction. Then, the other end surface of the inner ring 9 in the axial direction is pressed down in the axial direction by the caulking section 20, and the inner ring 9 is fixed to the hub main body 8.

Further, the hub-side face spline 21 (see FIG. 9) is formed on the other end surface of the caulking section 20 in the axial direction.

Figure 2:
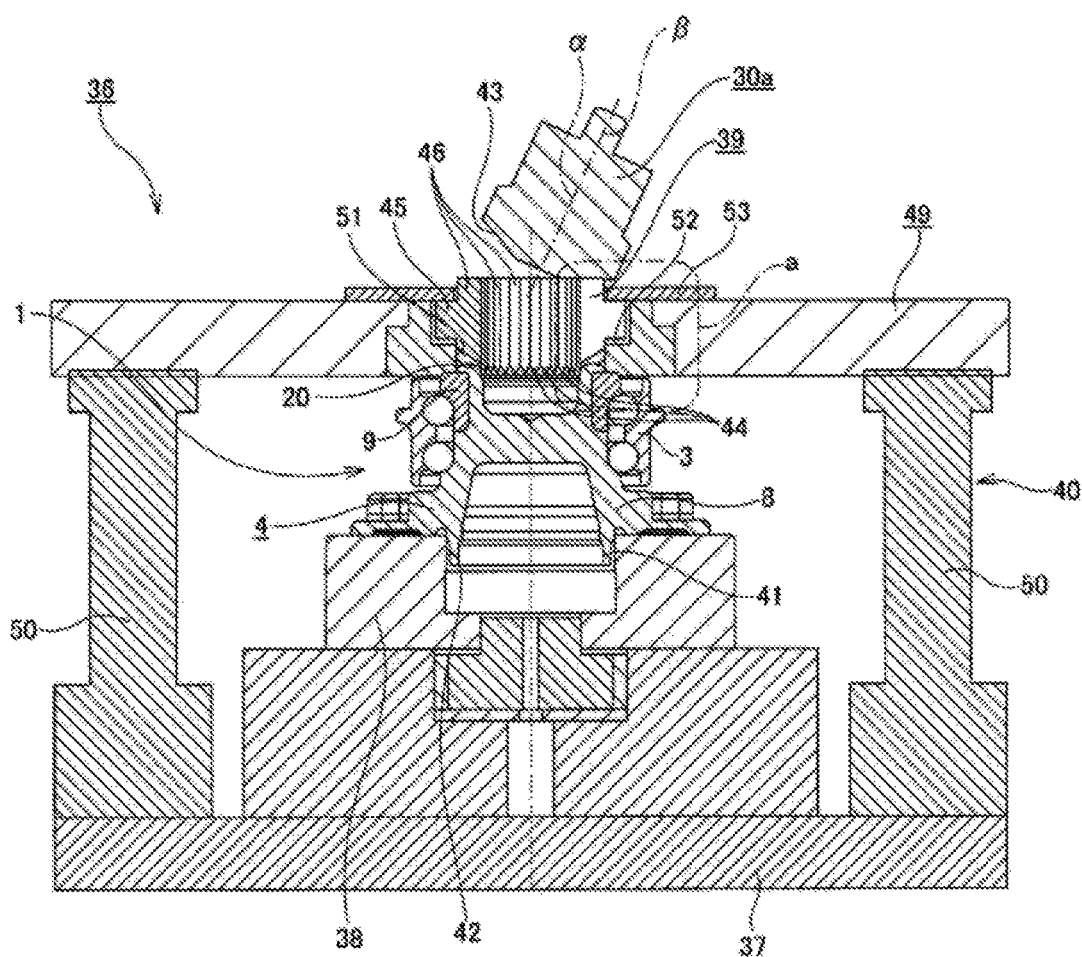
FIG. 2 is a cross-sectional view showing an example of the rotating press apparatus of the first embodiment in a processing state.
Figure 3:
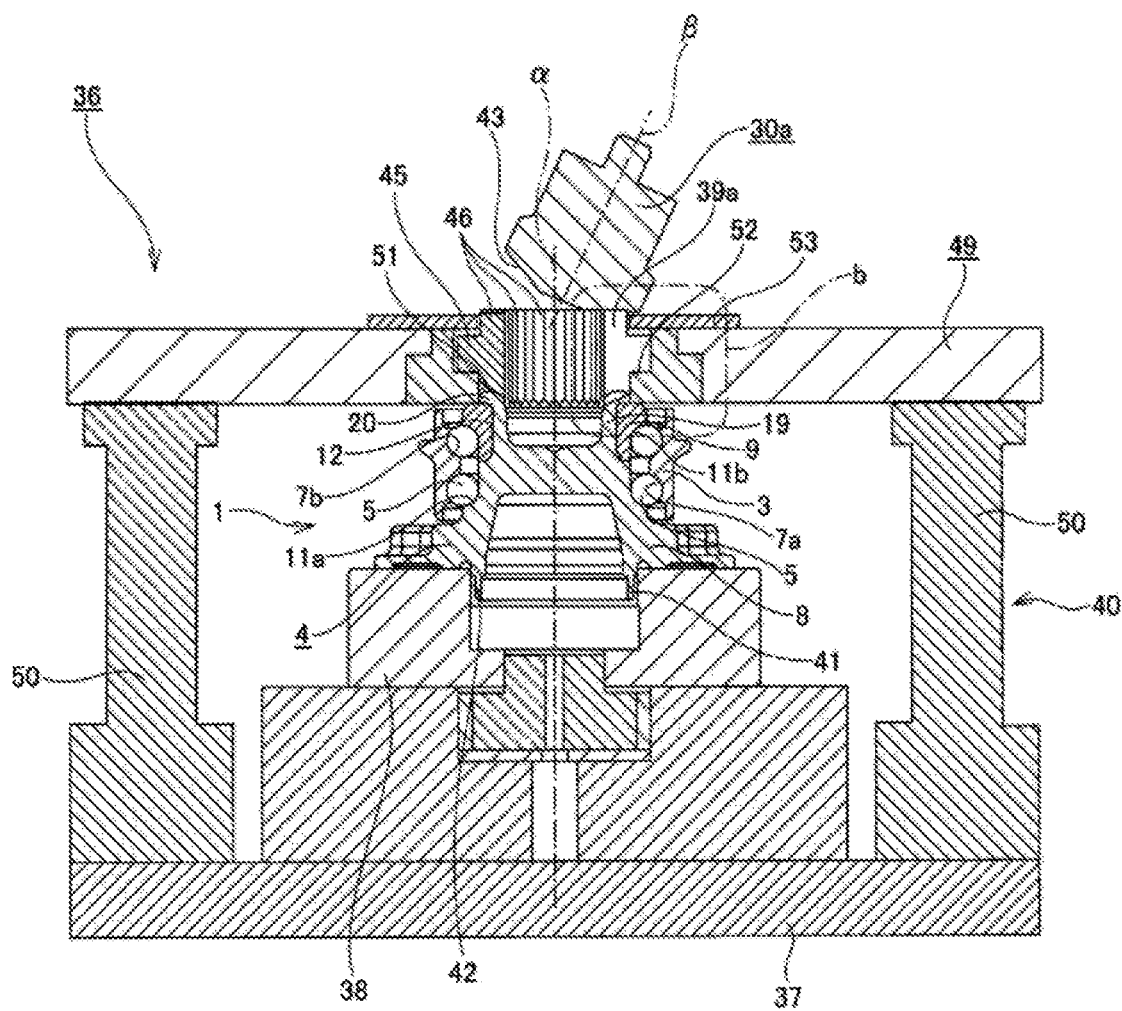
FIG. 3 is a cross-sectional view showing an example of the rotating press apparatus of the first embodiment in a state in which the processing is completed.
Figure 4A:
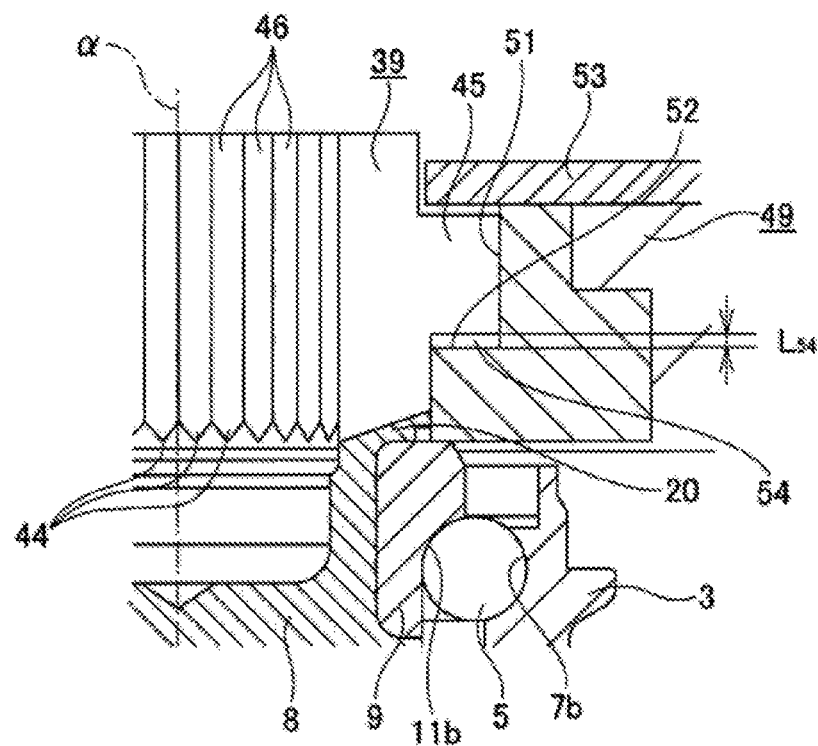
FIG. 4A is an enlarged view of a portion a in FIG. 2.
Figure 4B:
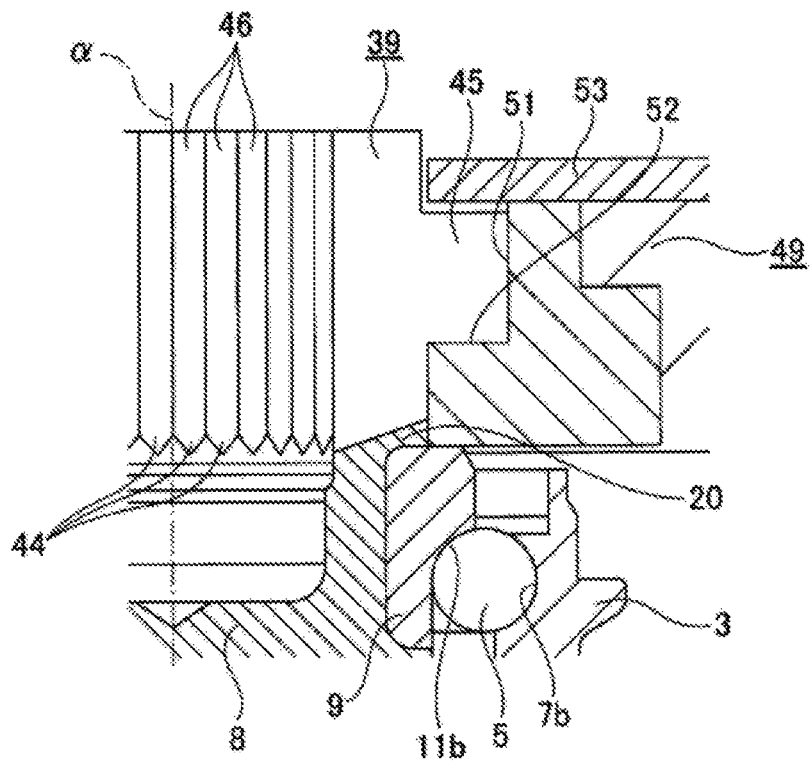
FIG. 4B is an enlarged view of a portion b in FIG. 3.

Rotary forging for forming the hub-side face spline 21 is performed using a rotating press apparatus (a manufacturing apparatus) 36 as shown in FIGS. 1 to 4B. FIG. 1 is a cross-sectional view showing an example of a rotating press apparatus that can perform the manufacturing method of the first embodiment of the present invention in a state before starting a processing of forming the hub-side face spline. FIG. 2 is a cross-sectional view showing an example of the rotating press apparatus shown in FIG. 1 in a processing state. FIG. 3 is a cross-sectional view showing an example of the rotating press apparatus in a state in which the processing is completed. FIG. 4A is an enlarged view of a portion a in FIG. 2, and FIG. 4B is an enlarged view of a portion b in FIG. 3.

The rotating press apparatus 36 includes a base frame 37, a holder 38 supported by and fixed to the other side surface of the base frame 37 in the axial direction, a roll 30*a*, a forming punch 39, a punch elevation mechanism 40, and a controller (not shown). The controller is configured to include a circuit and generally control the rotating press apparatus 36 as a whole.

The holder 38 has a holding concave section 42, into which a cylindrical section 41 referred to as a pilot section formed on one side portion of the hub main body 8 in the axial direction can be inserted, formed on the other side surface in the axial direction.

The roll 30*a* is supported to be rotated (self rotated) about a central axis β thereof inclined with respect to a central axis α of the hub main body 8 by a predetermined angle θ, and has a tip surface (a lower end surface in FIGS. 1 to 3) as a pressing surface 43 having a truncated conical shape. Further, in the case of the embodiment, the predetermined angle θ is 15° or more and 30° or less (15≤θ≤30).

Figure 5A:
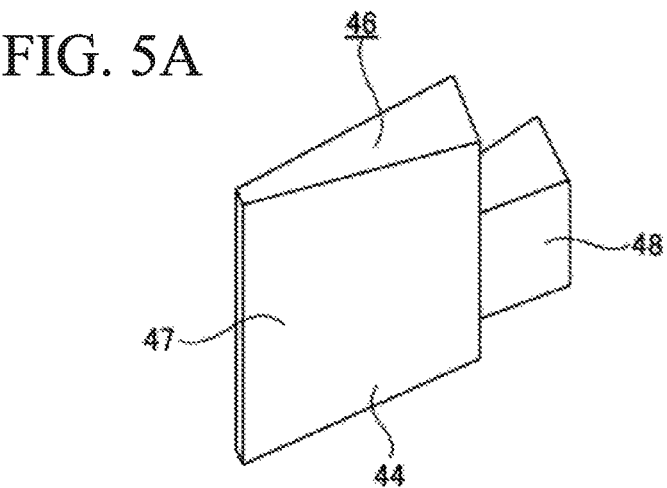
FIG. 5A is a perspective view showing one punch element that is taken out.
Figure 5B:
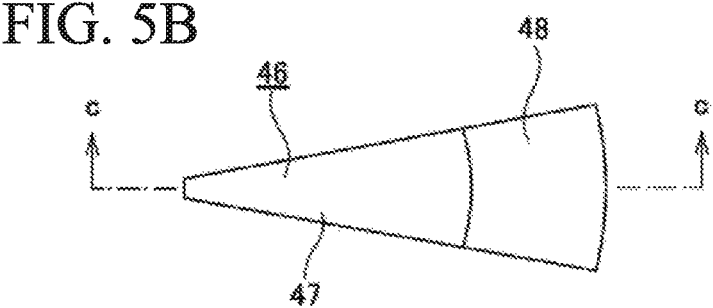
FIG. 5B is a plan view showing the punch element of FIG. 5A from above.
Figure 5C:
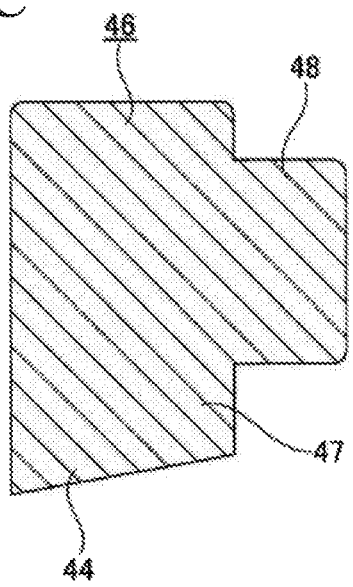
FIG. 5C is a cross-sectional view taken along line c-c in FIG. 5B.

FIG. 5A is a perspective view showing one punch element that is taken out, FIG. 5B is a plan view showing the punch element in FIG. 5A from above, and FIG. 5C is a cross-sectional view taken along line c-c in FIG. 5B. The forming punch 39 is formed in a substantially cylindrical shape as a whole, the same number of processing teeth 44 and 44 as the number of teeth of the hub-side face spline 21 are formed on one end surface in the axial direction at equal intervals in the circumferential direction, and a flange section 45 protruding outward in the radial direction is formed on an intermediate section of the outer circumferential surface in the axial direction throughout the circumference. The above-mentioned forming punch 39 is constituted by punch elements 46 and 46 that are equal in number to the processing teeth 44 and 44 and divided to correspond to the processing teeth 44 and 44 (divided at central positions of tooth bottoms between the processing teeth 44 and 44). In other words, the forming punch 39 is configured by combining punch elements 46 in the circumferential direction each constituted by an element main body 47, formed in a fan shape when seen from the axial direction and having one of the processing teeth 44 formed on one end surface in the axial direction, and a protrusion 48, formed on an intermediate section of the outer circumferential surface of the element main body 47 in the axial direction. The forming punch 39 having the above-mentioned configuration is supported by a punch holding plate 49 that constitutes the punch elevation mechanism 40 in a state in which the punch elements 46 and 46 allow only displacement with respect to the punch holding plate 49 in the axial direction.

The punch elevation mechanism 40 is provided to elevate the forming punch 39 (displace the hub main body 8 in the axial direction), and includes the punch holding plate 49 and hydraulic cylinders 50 and 50 installed between the punch holding plate 49 and the base frame 37. Among these, the punch holding plate 49 has a holding hole 51 formed in a central section and configured to hold the forming punch 39 without rattling in the radial direction and the circumferential direction. The holding hole 51 has a step surface section 52 formed on an intermediate section in the axial direction and configured to continue a small diameter section at one side in the axial direction and a large diameter section at the other side in the axial direction. Further, a dimension of the large diameter section in the axial direction is larger than a dimension (a thickness) of the flange section 45 of the forming punch 39 in the axial direction. In addition, in a state in which a half section of the forming punch 39 in the axial direction is inserted through the holding hole 51, an annular closing plate 53 is supported and fixed around an opening of the other side of the holding hole 51 in the axial direction. The punch holding plate 49 is supported by the hydraulic cylinders 50 and 50 to be elevated with respect to the base frame 37 (adjustment of a position in the axial direction is possible).

When rotary forging of forming the hub-side face spline 21 on the other end surface of the caulking section 20 in the axial direction using the rotating press apparatus 36 is performed, first, as shown in FIG. 1, the hydraulic cylinders 50 and 50 are operated to dispose the punch holding plate 49 at an upper side in a vertical direction such that one end surface of the forming punch 39 in the axial direction held by the punch holding plate 49 does not abut the other end surface of the wheel-supporting rolling bearing unit 1 in the axial direction held by the holder 38 (the other end surface of the caulking section 20 in the axial direction). In this state, one end surface of the flange section 45 of the forming punch 39 in the axial direction abuts the step surface section 52 formed on the intermediate section of the holding hole 51 in the axial direction, and a gap is interposed between the other end surface of the flange section 45 in the axial direction and a portion of one side surface of the closing plate 53 in the axial direction close to an inner end in the radial direction. In addition, the wheel-supporting rolling bearing unit 1 is held by the holder 38 without rattling in a state in which a cylindrical section (a pilot section) 41 of the hub main body 8 is inserted into the holding concave section 42 of the holder 38 without rattling.

Next, the hydraulic cylinders 50 and 50 are operated to displace the punch holding plate 49 downward, and one end surface of the forming punch 39 in the axial direction held by the punch holding plate 49 abuts the other end surface of the caulking section 20 in the axial direction. From this state, when the punch holding plate 49 is displaced further downward, the forming punch 39 is displaced toward the other side in the axial direction with respect to the holding plate 49, and as shown in FIGS. 2 and 4A, the other end surface of the flange section 45 of the forming punch 39 in the axial direction is made to abut a portion close to an inner diameter of one side surface of the closing plate 53 in the axial direction. In this state, a gap 54 {see FIG. 4A} is interposed between one end surface of the flange section 45 in the axial direction and the step surface section 52 of the holding hole 51 throughout the circumference.

In the case of the embodiment, an axial dimension of the flange section 45 or the holding hole 51 is regulated such that an axial dimension $L_{54}$ of the gap 54 is equal to a tooth depth of the tooth 32 (see FIG. 12) that constitutes the hub-side face spline 21. Next, a ram that supports the roll 30a is lowered, and a pressing surface 43 of the roll 30a abuts the other end surface of the forming punch 39 in the axial direction.

Then, the roll 30a is rotated about the central axis α of the hub main body 8 in a state in which the other end surface of the forming punch 39 in the axial direction is pressed by the pressing surface 43 of the roll 30a with a predetermined pressing force. That is, the roll 30a is rotated about the central axis α of the hub main body 8 in a state in which the other end surfaces of the punch elements 46 and 46 in the axial direction that constitute the forming punch 39 are directed toward one side in the axial direction and pressed by the pressing surface 43 of the roll 30a with a predetermined pressing force. Accordingly, the punch elements 46 and 46 abutting the pressing surface 43 of the roll 30a are pressed toward one side in the axial direction, the processing teeth 44 and 44 formed on one end surfaces of the punch elements 46 and 46 in the axial direction are pressed against the other end surface of the caulking section 20 in the axial direction, and the other end surface of the caulking section 20 in the axial direction is plastically deformed. Then, the punch elements 46 and 46 pressed by the pressing surface 43 of the roll 30a deviate in the same direction as the revolution direction in the circumferential direction of the forming punch 39 as the roll 30a rotates (revolves) about the central axis α of the hub main body 8. A plurality of punch elements (a plurality of elements) 46 are disposed to be independently movable at least in the axial direction. A punch elevation mechanism (a mechanism) 40 has a mode of moving some of the plurality of punch elements 46 (one of the punch elements 46 or a small number of the punch elements 46) in the axial direction and pressing a first region of the bearing unit 1 (a workpiece), and a mode of moving some other of the plurality of punch elements 46 (one of the punch elements 46 or a small number of the punch elements 46) in the axial direction and pressing a second region of the bearing unit 1 (the workpiece). During plastic working, a press region is varied in the circumferential direction.

Figure 6A:
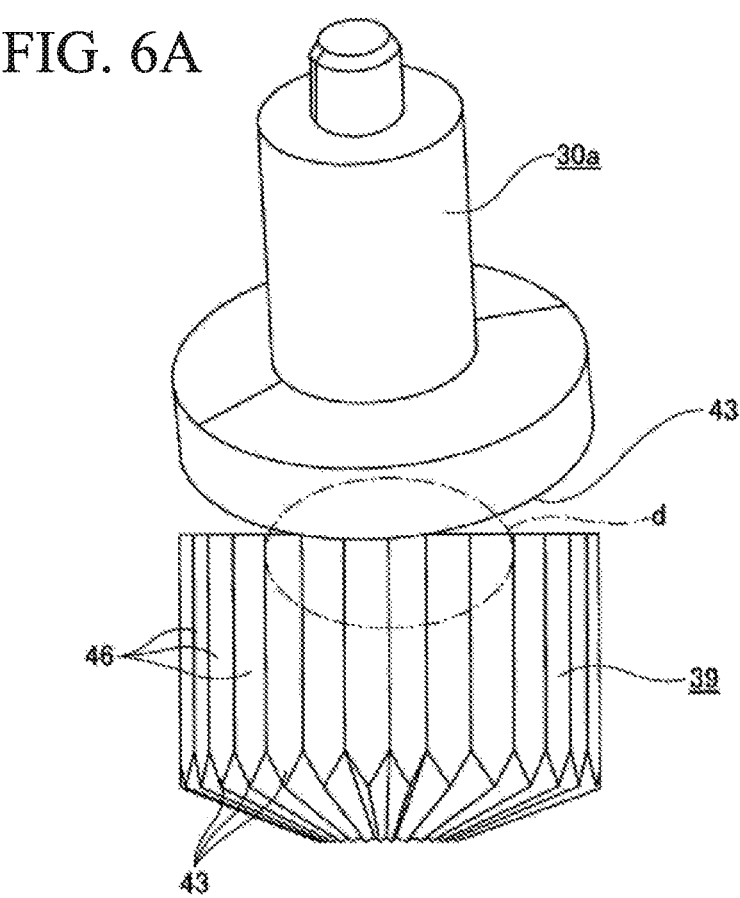
FIG. 6A is a side view showing a roll and a forming punch that are taken out.
Figure 6B:
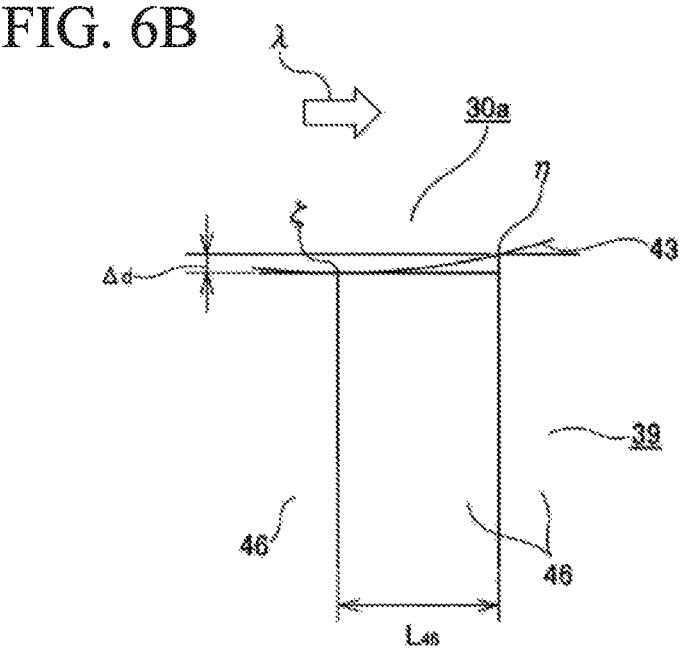
FIG. 6B is an enlarged view of a portion d in FIG. 6A.

FIG. 6A is a side view showing the roll and the forming punch that are taken out, and FIG. 6B is an enlarged view of a portion d in FIG. 6A. In the case of the embodiment, as shown in FIGS. 6A and 6B, in a state in which a rear side edge ζ, that is rear side edge in a rotating direction {a direction of an arrow λ in FIG. 6B} of the roll 30a, which rotates about the central axis α of the hub main body 8, and that is one of the side edges in the circumferential direction of the other end surface of the one punch element 46 in the axial direction among the punch elements 46 and 46, is pressed by the pressing surface 43 of the roll 30a, a side edge (a side edge at a rear side in the rotating direction of the roll 30a that rotates about the central axis α) η, which is a side edge closer to the one punch element 46, of a punch element 46 existing next to the one punch element 46 at a front side {a right side in FIG. 6B} in the rotating direction of the roll 30a, which rotates about the central axis α of the hub main body 8, and that is one of the side edge among both side edges of the punch element 46 existing next to the one punch element 46 in the circumferential direction of the other end surface of the punch element 46 existing next to the one punch element 46 in the axial direction is made not to be pressed by the pressing surface 43 of the roll 30a.

Specifically, in a state in which a rear side surface among the both side surfaces of the one punch element 46 in the circumferential direction in the rotating direction of the roll 30a about the central axis α of the hub main body 8 and a virtual plane including the central axis α and the central axis β of the roll 30a are on the same plane, a side edge which is a side edge closer to the one punch element 46, of a punch element 46, that exists in front of the one punch element 46 in the rotating direction of the roll 30a, which rotates about the central axis α of the hub main body 8, and that is one of the side edge among both side edges of the punch element 46 existing next to the one punch element 46 in the circumferential direction of the other end surface of the punch element 46 existing next to the one punch element 46 in the axial direction, and the pressing surface 46 of the roll 30a are made to stay in contact with or close to each other (i.e., the other end surface of the punch element existing in front of the one punch element 46 in the rotating direction of the roll is not strongly pressed by the pressing surface).

For this reason, a pressing quantity Δd of the other end surface of the one punch element 46 in the axial direction (a pressing quantity of the hub main body in the axial direction) per revolution of the roll 30a about the central axis α of the hub main body 8 by the pressing surface 43 of the roll 30a is adjusted.

Figure 7:
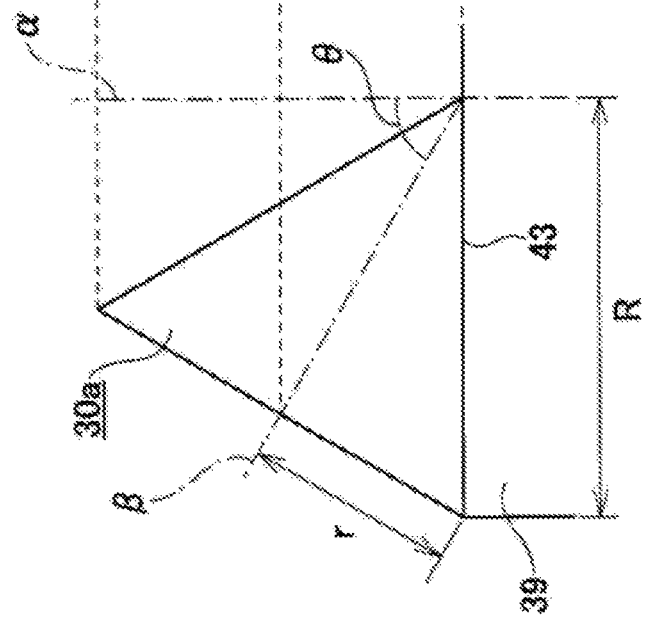
FIG. 7(A) is a view showing a state in which a cross section of an abutting section between a pressing surface of the roll and the other end surface of the forming punch in the axial direction is schematically shown.
FIG. 7(B) is a view showing a state in which the state of FIG. 7(A) is seen from a left side.
Figure 7:
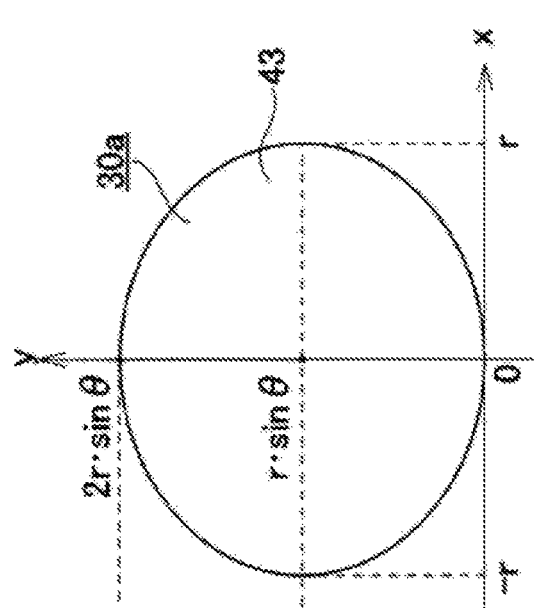

A magnitude of the pressing quantity Δd will be described with reference to FIGS. 6A, 6B and 7. Part (A) of FIG. 7 schematically shows a cross section of an abutting section between the pressing surface 43 of the roll 30a and one end surface of the forming punch 39 in the axial direction. In addition, part (B) of FIG. 7 shows a state of part (A) of FIG. 7 seen from a left side. That is, part (B) of FIG. 7 shows an outline of the pressing surface 43 of the roll 30a using an x-y coordinate system in which a starting point is set as an outer end portion of the abutting section in the radial direction between the pressing surface 43 of the roll 30a and one end surface of the forming punch 39 in the axial direction, and an x-axis and a y-axis that are perpendicular to each other are set to coincide with a front-back direction in part (A) of FIG. 7 and the axial direction of the hub main body 8, respectively. R in parts (A) and (B) of FIG. 7 represents an outer diameter of the abutting section between the pressing surface 43 of the roll 30a and one end surface of the forming punch 39 in the axial direction, and r (=R cos θ) in parts (A) and (B) of FIG. 7 represents a maximum radius of the pressing surface 43 (a dimension between an outer circumferential edge of the abutting section and the central axis β of the roll 30a). In the x-y coordinate system, an outline of the pressing surface 43 is represented by the following equation (1).

[Math. 1]

$$\frac{(y - r\sin\theta)^2}{(r\sin\theta)^2} + \frac{x^2}{r^2} = 1 \quad (1)$$

When equation (1) is converted, the following equation (2) is obtained.

[Math. 2]

$$y = (r - \sqrt{r^2 - x^2}) \cdot \sin\theta \quad (2)$$

Here, a maximum value $L_{46}$ of a width of the punch elements 46 and 46 (a width of the forming punch 39 in the circumferential direction) is represented by the following equation (3) when the total number of punch elements 46 and 46 is N.

[Math. 3]

$$L_{46} = \frac{\pi}{N} \cdot R \quad (3)$$

As the width $L_{46}$ represented by equation (3) is substituted into equation (2), it is possible to approximately obtain a pressing quantity $\Delta d_{max}$ (an upper limit value of a pressing quantity Δd of the punch elements 46 and 46 per revolution of the roll 30a about the central axis α of the hub main body 8) in which the side edge η, which is a side edge closer to the one punch element 46, of a punch element 46 existing next to the one punch element 46 at a front side {a right side in FIGS. 6A and 6B} in the rotating direction of the roll 30a, which rotates about the central axis α, and that is one of the side edge among both side edges of the punch element 46 existing next to the one punch element 46 in the circumferential direction of the other end surface of the punch element 46 existing next to the one punch element 46 in the axial direction does not contact with the pressing surface 43 of the roll 30a in a state in which the rear side edge ζ, that is rear side edge in a rotating direction of the roll 30a, which rotates about the central axis α, and that is one of the side edges in the circumferential direction of the other end surface of the one punch element 46 in the axial direction among the punch elements 46 and 46. In the case of the embodiment, specifically, when the inclination angle θ is 15° to 30°, the pressing quantity Δd is adjusted to 0.13 to 0.3 [mm].

When a tooth depth of the teeth 32 that constitute the hub-side face spline 21 formed on the other end surface of the caulking section 20 in the axial direction is increased according to progress of the rotary forging, the forming punch 39 is lowered and the axial dimension $L_{54}$ of the gap 54 is reduced. Then, in a state in which the tooth depth of each of the teeth 32 has a desired magnitude and one end surface of the flange section 45 of the forming punch 39 in the axial direction abuts the step surface section 52 of the holding hole 51 ($L_{54}$=0), the rotary forging is completed.

Further, in the case of the embodiment, the roll 30a is supported to be rotated (self rotated) about the central axis β thereof. Accordingly, when the roll 30a is rotated about the central axis α of the hub main body 8, the roll 30a is rotated (self rotated) about the central axis β thereof on the basis of frictional engagement between the pressing surface 43 of the roll 30a and the other end surface of the forming punch 39 in the axial direction.

According to the method of manufacturing the wheel-supporting rolling bearing unit 1 of the above-mentioned embodiment, manufacturing cost can be suppressed while durability of the wheel-supporting rolling bearing unit 1 is secured.

That is, in the case of the embodiment, in a state in which one end surface of the forming punch 39 in the axial direction is faced to the other end surface of the caulking section 20 in the axial direction, the roll 30a is rotated about the central axis α of the hub main body 8 while pressing the other end surface of the forming punch 39 in the axial direction by using the pressing surface 43 of the roll 30a. Accordingly, when the processing teeth 44 and 44 formed on one end surface of the forming punch 39 in the axial direction are pressed against the other end surface of the caulking section 20 in the axial direction, the hub-side face spline 21 is formed on the other end surface of the caulking section 20 in the axial direction. Here, the punch elements 46 and 46 that constitute the forming punch 39 can only be displaced in the axial direction. For this reason, even when the other end surfaces of the punch elements 46 and 46 in the axial direction are pressed by the pressing surface 43 of the roll 30a while rotating the roll 30a about the central axis α of the hub main body 8, the tooth surfaces of the processing teeth 44 and 44 will not be inclined with respect to the tooth surface of the tooth 32 that constitutes the hub-side face spline 21. Accordingly, occurrence of local abutting between the tooth surfaces of the processing teeth 44 and 44 and the end surface of the caulking section 20 in the axial direction, such as local plastic deformation of the tooth surfaces of the teeth 32, can be prevented. Accordingly, straightness of the cross-sectional shape of the teeth 32 can be improved, and in a state in which the hub-side face spline 21 is meshed with the joint-side face spline 26 (see FIG. 9) formed on the outer ring 2 for a constant velocity joint, an abutting area between the tooth surfaces of the teeth 32 that constitute the hub-side face spline 21 and the tooth that constitutes the joint-side face spline 26 can be sufficiently increased. As a result, durability of the meshing section between the hub-side face spline 21 and the joint-side face spline 26, and further, the wheel-supporting rolling bearing unit 1 as a whole can be sufficiently secured.

In addition, since the inclination angle θ can be increased (the inclination angle θ can be 15° or more), a force (a pressing force) F pressing the pressing surface 43 of the roll 30a toward the other end surface of the caulking section 20 in the axial direction via the forming punch 39 can be prevented from being excessively increased. As a result, the press apparatus 36 can be prevented from being wastefully increased, and an increase in manufacturing cost of the wheel-supporting rolling bearing unit 1 is suppressed. In particular, in the case of the embodiment, in a state in which the rear side edge ζ, that is rear side edge in a rotating direction of the roll 30a, which rotates about the central axis α of the hub main body 8, and that is one of the side edges in the circumferential direction of the other end surface of the one punch element 46 in the axial direction among the punch elements 46 and 46, is pressed by the pressing surface 43 of the roll 30a, the side edge η, which is a side edge closer to the one punch element 46, of a punch element 46 existing next to the one punch element 46 at a front side in the rotating direction of the roll 30a, which rotates about the central axis α of the hub main body 8, and that is one of the side edge among both side edges of the punch element 46 existing next to the one punch element 46 in the circumferential direction of the other end surface of the punch element 46 existing next to the one punch element 46 in the axial direction is made to be in contact with the pressing surface 43 of the roll 30a. Accordingly, when the roll 30a is rotated about the central axis α of the hub main body 8 from a state in which the pressing surface 43 of the roll 30a is pressing a rear side edge of the roll 30a in the rotating direction about the central axis α among the both of the side edges in the circumferential direction of the other end surface of the one punch element 46 in the axial direction, the punch element 46 existing next to the one punch element 46 at the front side in the rotating direction of the roll 30a about the central axis α of the hub main body 8 starts to be pressed by the pressing surface 43 of the roll 30a. In this way, the pressing force by the roll 30a can be effectively used as a force for plastically deforming the other end surface of the caulking section 20 in the axial direction, and a time consumed for processing can be reduced while the force F is suppressed to a small level.

Further, as will be apparent from FIG. 11, when the inclination angle θ of the central axis β of the roll 30a with respect to the central axis α of the hub main body 8 exceeds 30°, the abutting area between the pressing surface 43 of the roll 30a and the other end surface of the forming punch 39 in the axial direction is decreased, an abutting surface pressure therebetween is excessively increased, and thus it may be difficult to secure durability of the pressing surface 43 of the roll 30a. Here, in the case of the embodiment, the inclination angle θ is 30° or less.

Figure 8A:
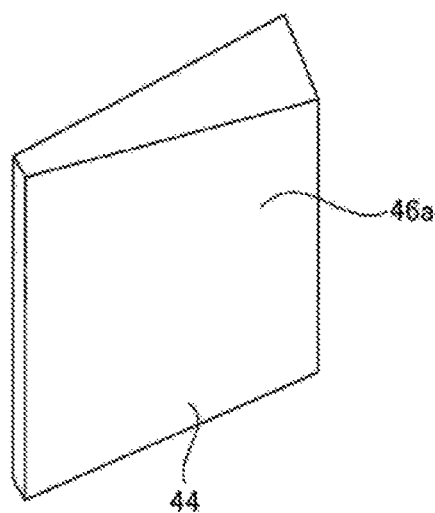
FIG. 8A is a view similar to FIG. 5A, showing another example of the punch element.
Figure 8B:
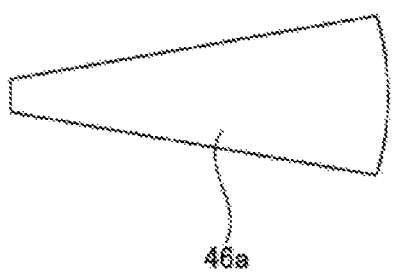
FIG. 8B is a view similar to FIG. 5B, showing the other example of the punch element.
Figure 8C:
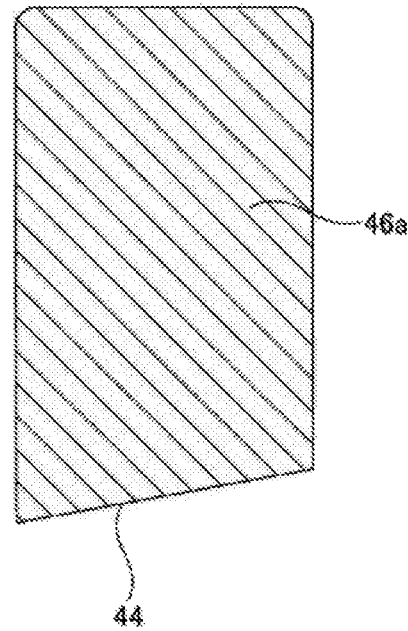
FIG. 8C is a view similar to FIG. 5C, showing the other example of the punch element.

In addition, when the first embodiment of the present invention is performed, the outer circumferential surface of the forming punch may be a single cylindrical surface with no variation in diameter in the axial direction without the flange section that protrudes outward from the outer circumferential surface of the forming punch in the radial direction being formed. That is, as shown in FIGS. 8A to 8C, the forming punch is obtained by combining a plurality of punch elements 46a each having the processing teeth 44 formed on one end surface in the axial direction. FIG. 8A is a view similar to FIG. 5A, showing another example of the punch element, FIG. 8B is a view similar to FIG. 5B, showing the other example of the punch element, and FIG. 8C is a view similar to FIG. 5C, showing the other example of the punch element. In this case, for example, processing of forming the hub-side face spline 21 is completed when displacement of the roll 30a in the axial direction of the hub main body 8 is detected and the displacement is equal to the tooth depth of the tooth 32 that constitutes the hub-side face spline 21.

EXAMPLE

In a specific example shown here, when the method of manufacturing the rolling bearing unit of the first embodiment of the present invention is performed using the rotating press apparatus 36 shown in FIGS. 1 to 4B, a pressing quantity $\Delta d_{max}$ when the side edge, which is a side edge closer to the one punch element 46, of a punch element 46 existing next to the one punch element 46 at a front side {a left side in FIG. 6A} in the rotating direction of the roll 30a, which rotates about the central axis α of the hub main body 8, and that is one of the side edge among both side edges of the punch element 46 existing next to the one punch element 46 in the circumferential direction of the other end surface of the punch element 46 existing next to the one punch element 46 in the axial direction comes in contact with the pressing surface 43 of the roll 30a is obtained in a state in which the rear side edge, that is rear side edge in a rotating direction of the roll 30a, which rotates about the central axis α of the hub main body 8, and that is one of the side edges in the circumferential direction of the other end surface of the one punch element 46 in the axial direction of the punch element 46.

First, when a total number N of the punch elements 46 and 46 that constitute the forming punch 39 is 31, the inclination angle θ of the central axis β of the roll 30a with respect to the central axis α of the hub main body 8 is 30°, and a maximum diameter R of the pressing surface 43 of the roll 30a is 24 [mm], the pressing quantity $\Delta d_{max}$ is 0.3 [mm]. Here, for example, when a rotational number (a rotational speed) of the roll 30a about the central axis α of the hub main body 8 is 200 [rpm], the roll 30a is pressed (displaced) toward one side in the axial direction at a velocity of 1 [mm/sec].

In addition, when the total number N is 31, the inclination angle θ is 15°, and the maximum diameter R is 24 [mm], the pressing quantity $\Delta d_{max}$ is 0.13 [mm]. Here, for example, when a rotational number of the roll 30a about the central axis α of the hub main body 8 is 300 [rpm], the roll 30*a* is pressed (displaced) toward one side in the axial direction at a velocity of 0.65 [mm/sec].

Second Embodiment

A second embodiment of the present invention will be described with reference to FIGS. 14 to 20.

Figure 14:
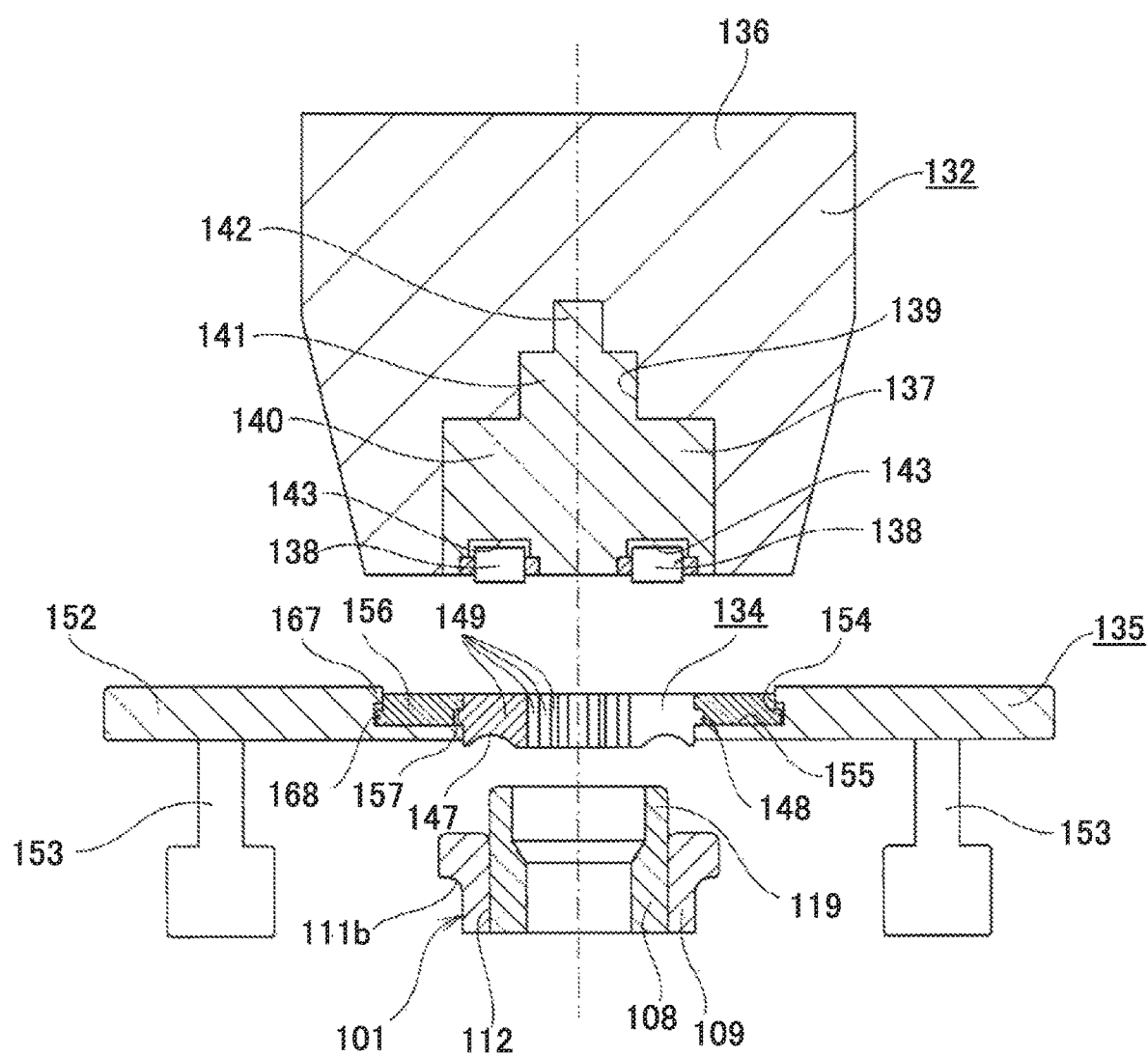
FIG. 14 is a cross-sectional view showing a portion of a processing apparatus according to a second embodiment of the present invention before starting a processing of forming a caulking section.

FIG. 14 is a cross-sectional view showing a portion of a processing apparatus according to the second embodiment of the present invention in a state before starting a processing of forming a caulking section.

Figure 15:
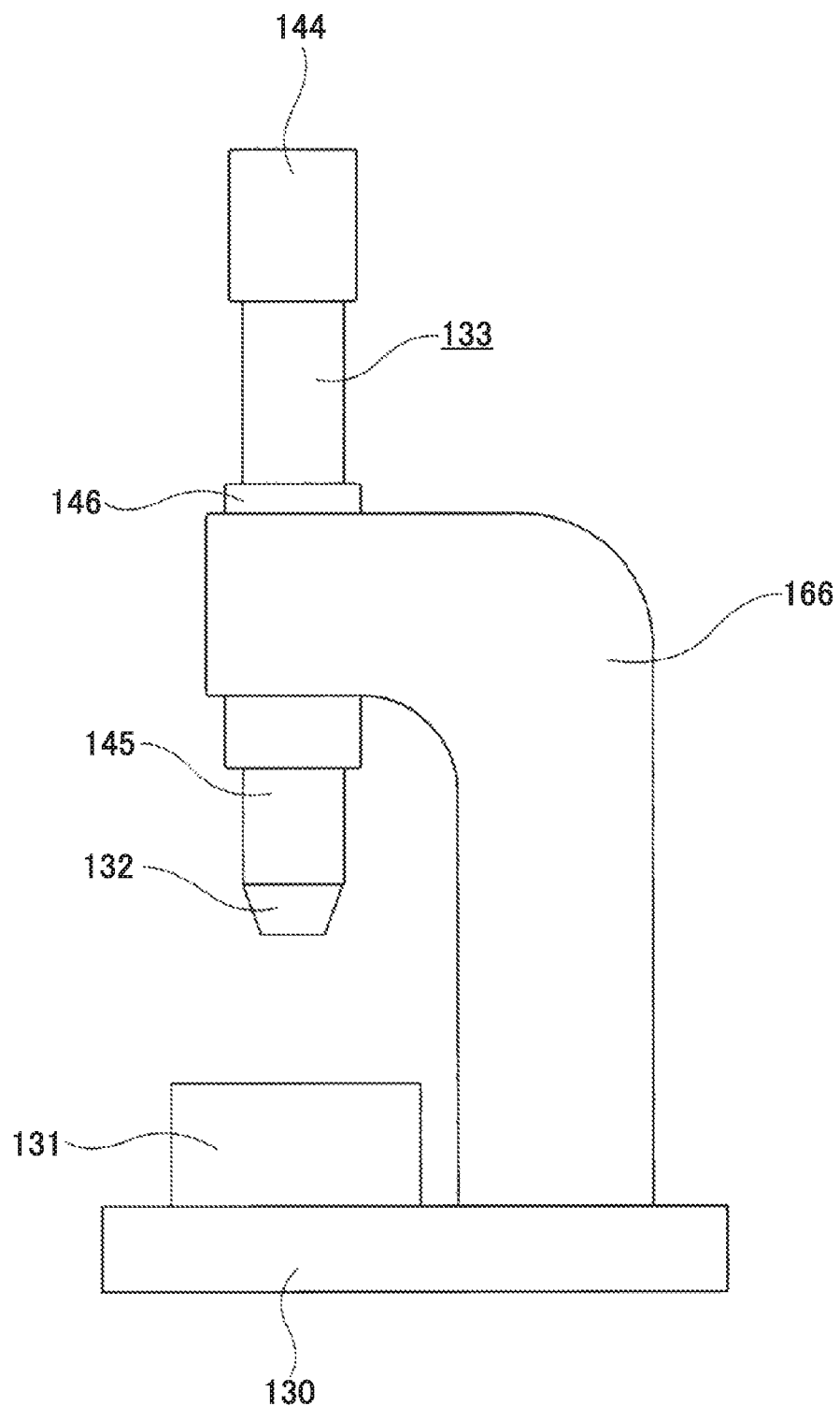
FIG. 15 is a schematic side view of the processing apparatus, a portion of which is omitted, in an example of the rotating press apparatus of the second embodiment.

FIG. 15 is a schematic side view of the processing apparatus, a portion of which is omitted, in an example of the rotating press apparatus of the second embodiment.

Figure 16:
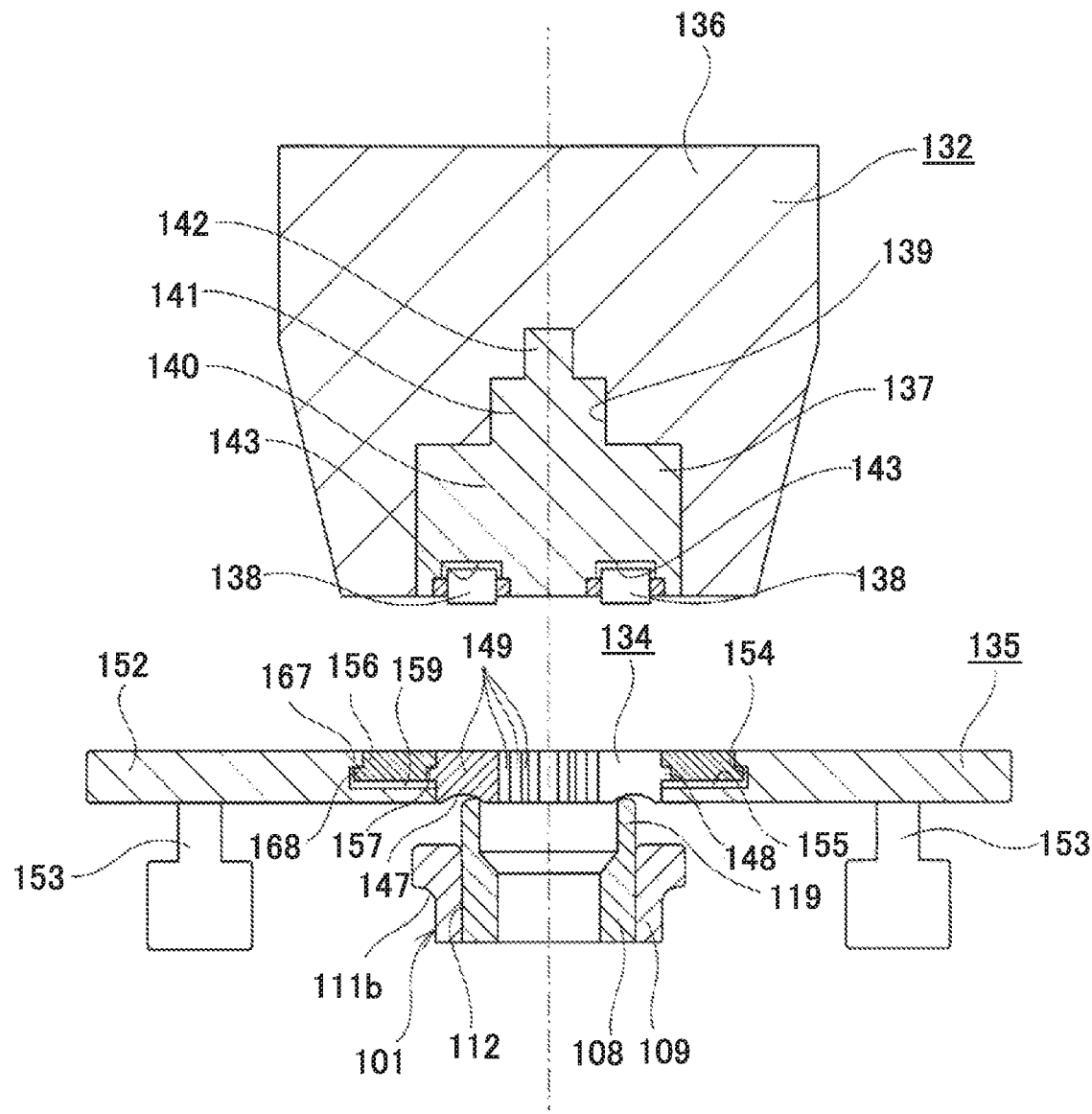
FIG. 16 is a cross-sectional view showing a portion of the processing apparatus in one example of the rotating press apparatus of the second embodiment in a state in which a lower end surface of a forming die for a caulking section abuts the other end surface of a cylindrical section of a hub main body in an axial direction after the state shown in FIG. 14.

FIG. 16 is a cross-sectional view showing a portion of the processing apparatus in one example of the rotating press apparatus of the second embodiment in a state in which a lower end surface of a forming die for a caulking section abuts the other end surface of a cylindrical section of a hub main body in an axial direction after the state shown in FIG. 14.

Figure 17:
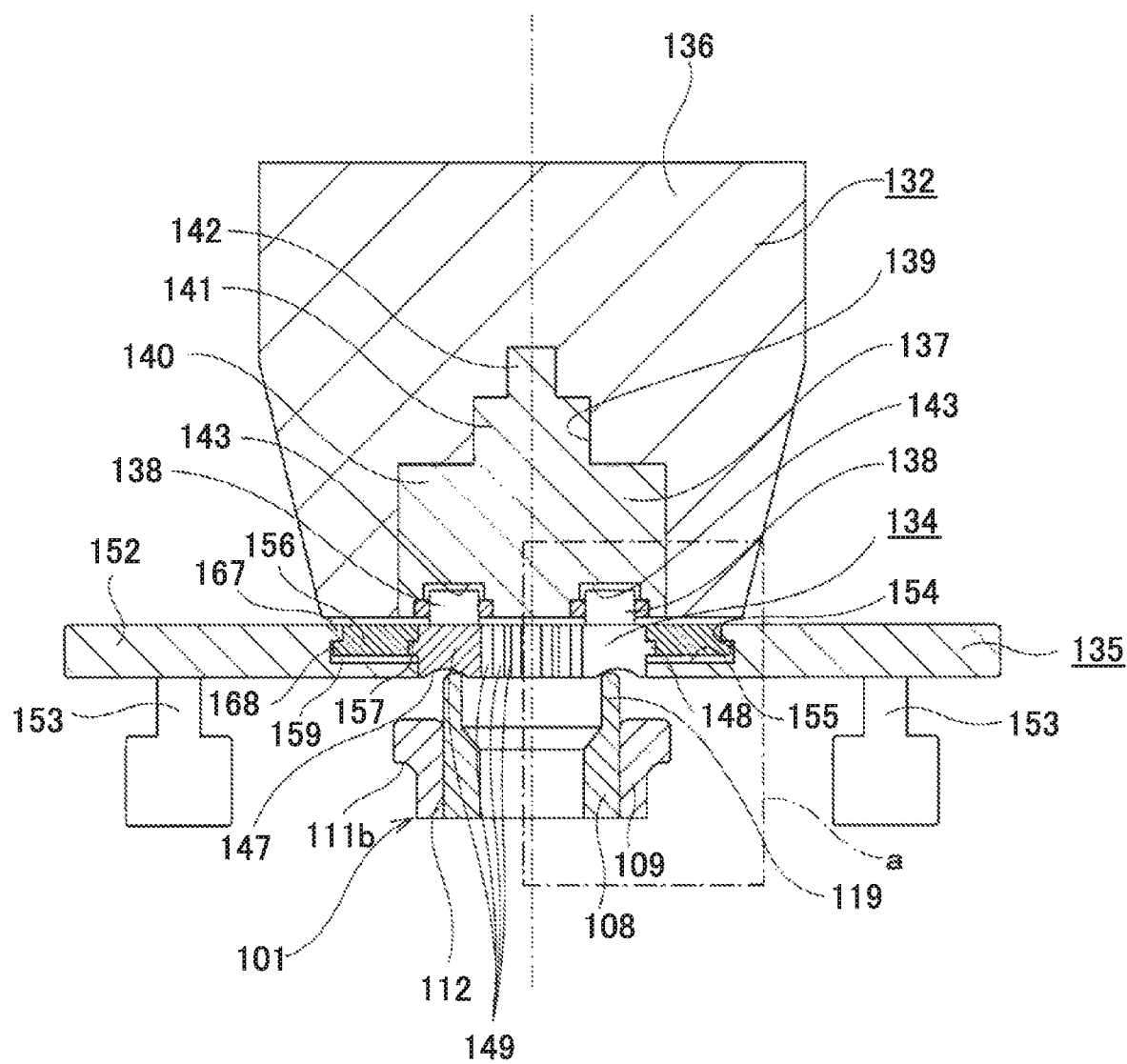
FIG. 17 is a cross-sectional view showing a portion of the processing apparatus in one example of the rotating press apparatus of the second embodiment in a state in which a plurality of rollers abut an upper end surface of the forming die for the caulking section after the state shown in FIG. 16.

FIG. 17 is a cross-sectional view showing a portion of the processing apparatus in one example of the rotating press apparatus of the second embodiment in a state in which a plurality of rollers abut an upper end surface of the forming die for the caulking section after the state shown in FIG. 16.

Figure 18:
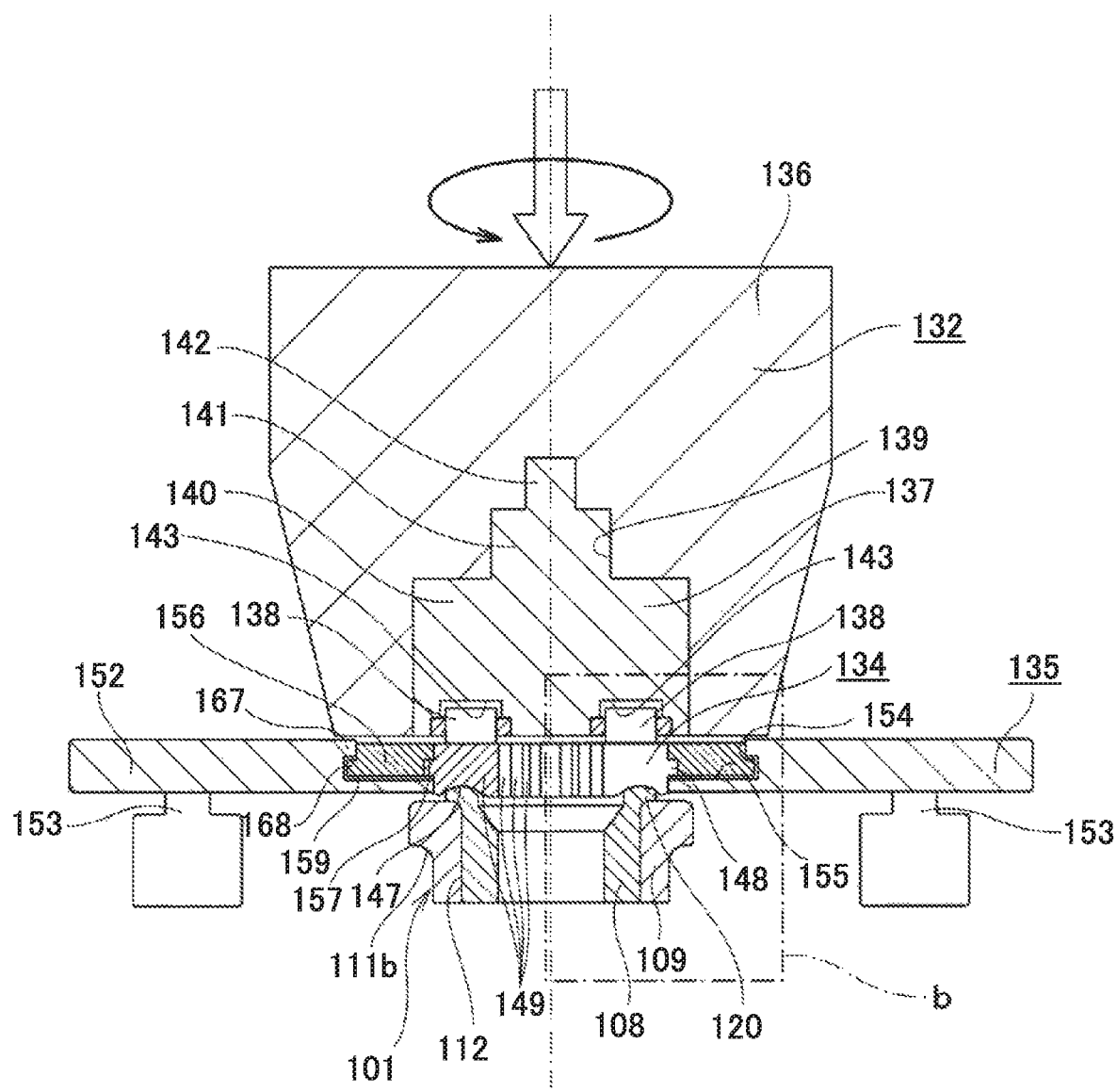
FIG. 18 is a cross-sectional view showing a portion of the processing apparatus in one example of the rotating press apparatus of the second embodiment in a state after the cylindrical section of the hub main body is processed into the caulking section after the state shown in FIG. 17.

FIG. 18 is a cross-sectional view showing a portion of the processing apparatus in one example of the rotating press apparatus of the second embodiment in a state after the cylindrical section of the hub main body is processed into the caulking section after the state shown in FIG. 17.

Figure 19A:
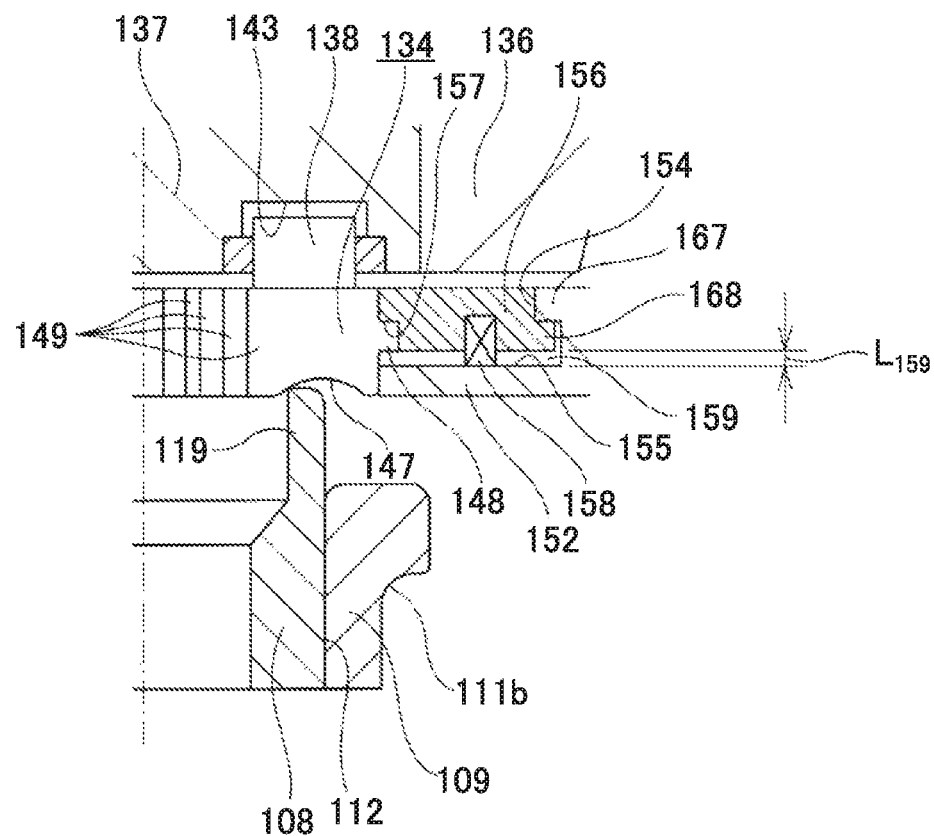
FIG. 19A is an enlarged view of a portion a in FIG. 17, showing one example of the rotating press apparatus of the second embodiment.
Figure 19B:
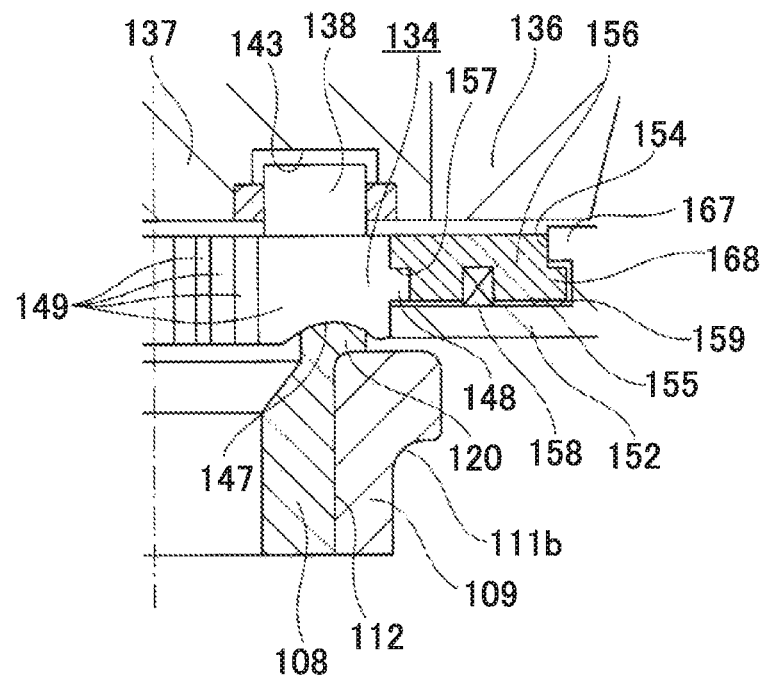
FIG. 19B is an enlarged view of a portion b in FIG. 18, showing one example of the rotating press apparatus of the second embodiment.

FIG. 19A is an enlarged view of a portion a in FIG. 17, showing one example of the rotating press apparatus of the second embodiment. FIG. 19B is an enlarged view of a portion b in FIG. 18.

Figure 20A:
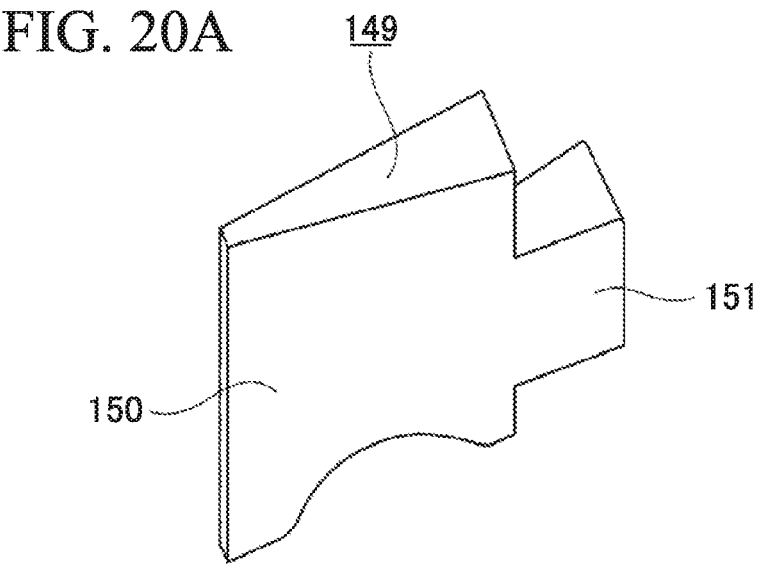
FIG. 20A is a perspective view showing one example of the rotating press apparatus of the second embodiment, one forming die element of which is taken out.
Figure 20B:
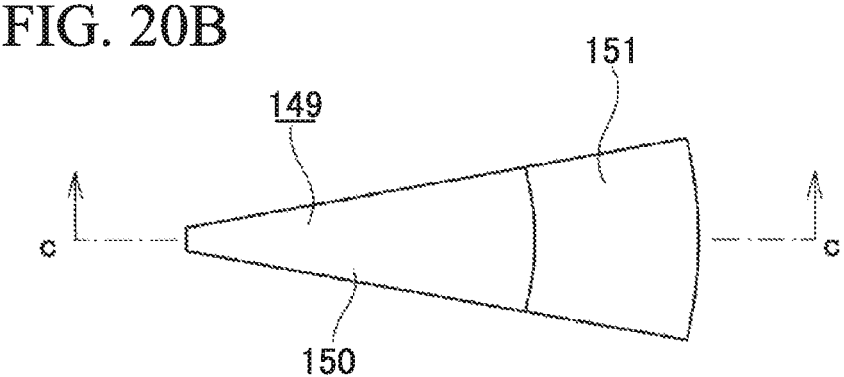
FIG. 20B is a plan view showing the forming die element in FIG. 20A in one example of the rotating press apparatus of the second embodiment from above.
Figure 20C:
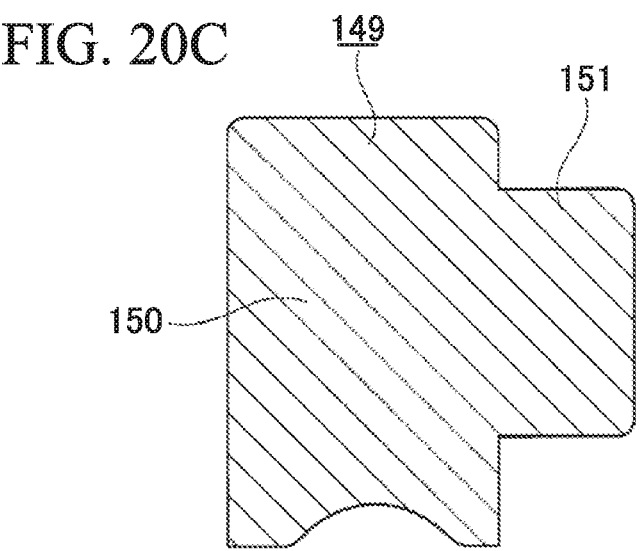
FIG. 20C is a cross-sectional view taken along line c-c in FIG. 20B, in one example of the rotating press apparatus of the second embodiment.

FIG. 20A is a perspective view showing one example of the rotating press apparatus of the second embodiment, one forming die element of which is taken out. FIG. 20B is a plan view showing the forming die element in FIG. 20A from above. FIG. 20C is a cross-sectional view taken along line c-c in FIG. 20B.

As an example of a target of the manufacturing method of the embodiment, as shown in FIG. 27, the wheel-supporting rolling bearing unit 101 including the outer ring 103, a hub 104 (a hub main body 108 having the inner ring track 111*a* at one side in the axial direction on the outer circumferential surface of the intermediate section of the hub main body in the axial direction, and the inner ring 109 having the inner ring track 111*b* at the other side in the axial direction on the outer circumferential surface), and a plurality of rolling elements 105 and 105, wherein a caulking section 120 is formed on the inner end portion of the hub main body 108 in the axial direction, and further, the hub-side face spline 121 is formed on the other end surface of the caulking section 120 in the axial direction, will be described.

Further, in the embodiment, a method of forming the caulking section 120 by performing plastic working on the cylindrical section 119 formed on the other portion of the hub main body 108 in the axial direction (the caulking section 120 before forming the hub-side face spline 121) will be described. Since a manufacturing method and an assembling method of members that constitute the wheel-supporting rolling bearing unit 101 until a formation of the caulking section 120, and a forming method of the hub-side face spline 121 after a formation of the caulking section 120 are similar to the method widely known from the related art, include the assembling methods already described, description thereof will be omitted in the embodiment.

Further, in FIGS. 14 to 18, only a portion of the wheel-supporting rolling bearing unit 101 (the other end side portion of the hub main body 108 in the axial direction and the inner ring 109) is shown, and illustration of other portions will be omitted.

In addition, in the following description according to the embodiment, an upward/downward direction is an upward/downward direction in FIGS. 14 to 19B. However, the upward/downward direction in FIGS. 14 to 19B does not necessarily coincide with the upward/downward direction during processing.

The processing apparatus (the manufacturing apparatus) for forming the caulking section 120 includes a base frame 130 (not shown in FIG. 15), a holder 131 (not shown in FIG. 15) supported by and fixed to an upper surface of the base frame 130, a pressing unit 132, a driving mechanism 133 for a pressing unit, a forming die 134 for a caulking section, an elevation mechanism 135 for a forming die, and a controller (not shown). The controller includes a circuit, and is configured to generally control the rotating press apparatus 36 as a whole.

The holder 131 is configured to hold the wheel-supporting rolling bearing unit 101 in a state in which the central axis of the hub main body 108 coincides with the vertical direction (the upward/downward direction) and the other portion of the hub main body 108 in the axial direction is directed upward.

The pressing unit 132 includes a head 136, a roller tool 137, and a plurality of (for example, 2 to 6) rollers 138 and 138, and is disposed above the hub main body 108.

The central axis of the head 136 coincides with the central axis of the hub main body 108. In addition, the head 136 has a bottomed attachment hole 139 opening at a central section of a lower end surface in the radial direction.

The roller tool 137 is formed in a stepped columnar shape, and includes a large diameter column section 140 at a lower end portion, an intermediate diameter column section 141 at an intermediate section in the upward/downward direction, and a small diameter column section 142 at an upper end portion, which are coaxial with each other. In addition, the roller tool 137 has a plurality of (equal to the number of rollers 138 and 138) holding concave sections 143 and 143 at equal intervals in the circumferential direction at the lower end surface of the large diameter column section 140. The roller tool 137 is attached and fixed in the attachment hole 139 of the head 136. For this reason, the attachment hole 139 is a bottomed stepped hole. An outer diameter-side retaining ring groove (not shown) is formed in the inner circumferential surface of the small diameter hole section formed in the upper end portion of the attachment hole 139, and an outer half portion of a retaining ring (not shown) in the radial direction is accommodated in the outer diameter-side retaining ring groove. Further, a diameter dimension of a groove bottom of the outer diameter-side retaining ring groove is larger than an outer diameter dimension in a state in which the retaining ring is free. Then, after the retaining ring is elastically expanded in diameter as the small diameter column section 142 is pushed into the small diameter hole section, the roller tool 137 is prevented from exiting from the attachment hole 139 by elastically recovering the retaining ring and bridging the retaining ring between both of the retaining ring grooves of the outer diameter side and the inner diameter side when the retaining ring is matched with the inner diameter-side retaining ring groove (not shown) formed on the outer circumferential surface of the small diameter column section 142. In addition, torque can be transmitted between the head 136 and the roller tool 137 by spline-coupling an inner circumferential surface of a medium diameter hole section formed on an intermediate section of the attachment hole 139 in the upward/downward direction and an outer circumferential surface of the intermediate diameter column section 141. Further, the large diameter column section 140 is fitted into a large diameter hole section formed on a lower end portion of the attachment hole 139 without rattling.

Each of the rollers 138 and 138 is respectively held in one of the holding concave sections 143 and 143. Accordingly, the rollers 138 and 138 are disposed on a circumference about the central axis of the hub main body 108 at equal intervals in the circumferential direction. That is, when the total number of rollers 138 and 138 is N {N is an integer of 2 or more (N=2, 3, 4, . . . )}, the rollers 138 and 138 are disposed on the circumference at a center angle pitch of (360/N)°. In addition, the rollers 138 and 138 are held in the holding concave sections 143 and 143 to be rotatable about only the central axes thereof in a state in which the central axes coincide with a radial direction about the central axis of the hub main body 108 (the central axis of the roller tool 137). In addition, in this state, portions of the outer circumferential surfaces of the rollers 138 and 138 protrude downward from lower end openings of the holding concave sections 143 and 143.

The driving mechanism 133 for a pressing unit is configured to rotate and elevate (displace in the axial direction of the hub main body 108) the pressing unit 132, and supported by a support column 166 fixed to the base frame 130. The driving mechanism 133 for a pressing unit includes a spindle 145 driven to be rotated directly (without intervention of a speed reducer mechanism) by an electric motor 144 and disposed in the upward/downward direction, and a hydraulic cylinder 146 driven to elevate the spindle 145. The head 136 (not shown in FIG. 15) of the pressing unit 132 is attached and fixed to the lower end portion of the spindle 145.

The forming die 134 for a caulking section is configured in a substantially cylindrical shape as a whole, and disposed on a portion between the hub main body 108 and the pressing unit 132 in the upward/downward direction. In the forming die 134 for a caulking section, a processing surface 147 (serving as an annular concave surface having an arc-shaped cross section) having a shape that matches an other end surface of the caulking section 120 in the axial direction is formed on one end surface in the axial direction, and a flange section 148 protruding outward in the radial direction is formed on the intermediate section of the outer circumferential surface in the axial direction throughout the circumference. The forming die 134 for a caulking section is configured by combining a plurality of (for example, 20 to 40) forming die elements 149 and 149 divided in the circumferential direction (for example, the plurality of forming die elements 149 and 149 disposed in the circumferential direction about the central axis of the hub main body 108). In other words, the forming die 134 for a caulking section is configured by combining the forming die elements 149 in the circumferential direction each constituted by an element main body 150 formed in a fan shape when seen from the axial direction and having a portion of the processing surface 147 in the circumferential direction formed on a lower end surface and a protrusion 51 serving as a portion of the flange section 148 in the circumferential direction formed on the intermediate section of the outer circumferential surface of the element main body 150 in the axial direction. The forming die 134 for a caulking section having the above-mentioned configuration is supported with respect to a holding plate 152 that constitutes the elevation mechanism 135 for a forming die in a state in which the forming die elements 149 and 149 are axially displaceable independently from each other.

The elevation mechanism 135 for a forming die is configured to elevate (displace the hub main body 108 in the axial direction) the forming die 134 for a caulking section, and includes the holding plate 152, and hydraulic or pneumatic cylinders 153 and 153 installed between the holding plate 152 and the base frame 130.

The holding plate 152 is disposed in the horizontal direction, and a holding hole 154 configured to hold the forming die 134 for a caulking section without rattling in the radial direction and the circumferential direction is formed in a central section thereof. The holding hole 154 is a stepped hole that continues a small diameter section at a lower side and a large diameter section at an upper side using a step surface section 155. Further, an axial dimension of the large diameter section is larger than an axial dimension of the flange section 148 of the forming die 134 for a caulking section. In addition, an inward flange section 167 is formed on the upper half portion of the large diameter section. Further, in the case of the embodiment, the holding plate 152 has a configuration that can be divided into two parts in the radial direction.

In a state in which the forming die 134 for a caulking section is held in the holding hole 154, an annular presser plate 156 is fitted into the large diameter section of the holding hole 154. A center hole of the presser plate 156 is a stepped hole that connects the small diameter section at the upper side and the large diameter section at the lower side using a step surface section 157.

An outward flange section 168 is formed on a lower half portion of an outer circumferential surface of the presser plate 156.

An upper half portion of the outer circumferential surface of the presser plate 156 is guided to be displaceable in the axial direction by the inner circumferential surface of the inward flange section 167 without rattling in the radial direction.

The presser plate 156 is biased toward the step surface section 155 of the holding hole 154 by a biasing spring 158 schematically shown in FIGS. 19A and 19B to stabilize a posture of the forming die 134 for a caulking section.

In a state before starting a processing of forming the caulking section 120 (a state shown in FIG. 14), the flange section 148 of the forming die 134 for a caulking section is disposed between the step surface section 155 of the holding hole 154 and the step surface section 157 of the presser plate 156 by elastic force of the biasing spring 158. In addition, in this state, a gap is formed between an upper surface of the outward flange section 168 and a lower surface of the inward flange section 167.

The holding plate 152 is supported by the cylinders 153 and 153 to be able to elevate with respect to the base frame 130.

When the caulking section 120 is formed on the other portion of the hub main body 108 in the axial direction using the above-mentioned processing apparatus, first, as shown in FIG. 14, the cylinders 153 and 153 are operated to place the holding plate 152 at an upper side in the vertical direction such that the processing surface 147 formed on the lower end surface of the forming die 134 for a caulking section does not abut the other end surface (the other end surface of the cylindrical section 119 of the hub main body 108 in the axial direction) of the wheel-supporting rolling bearing unit 101 in the axial direction held by the holder 131. In this state, as described above, the flange section 148 of the forming die 134 for a caulking section is disposed between the step surface section 155 of the holding hole 154 and the step surface section 157 of the presser plate 156 by elastic force of the biasing spring 158. In addition, the wheel-supporting rolling bearing unit 101 is held in a state in which the central axis of the hub main body 108 coincides with the holder 131 in the vertical direction and the other end portion of the hub main body 108 in the axial direction is directed upward.

Next, as shown in FIGS. 14 to 16, as the cylinders 153 and 153 are operated to displace the holding plate 152 downward, the processing surface 147 of the forming die 134 for a caulking section abuts the other end surface of the cylindrical section 119 of the hub main body 108 in the axial direction. From this state, as the holding plate 152 is displaced further downward, the forming die 134 for a caulking section and the presser plate 156 are displaced upward with respect to the holding plate 152 against elastic force of the biasing spring 158. Then, as shown in FIGS. 16 and 19A, a gap 159 in the axial direction (the upward/downward direction) is formed between the lower surface of the flange section 148 of the forming die 134 for a caulking section and the step surface section 155 of the holding hole 154 by bringing the upper surface of the outward flange section 168 of the presser plate 156 in contact with the lower surface of the inward flange section 167 of the holding plate 152. An axial dimension $L_{159}$ of the gap 159 will be described below.

Next, as shown in FIGS. 16 and 17, as the driving mechanism 133 for a pressing unit is operated to displace the pressing unit 132 downward, the outer circumferential surfaces of the rollers 138 and 138 rollably abut the upper end surface that is the other end surface of the forming die 134 for a caulking section in the axial direction.

Next, as shown in FIGS. 17 and 18 {and FIGS. 19A and 19B}, when the pressing unit 132 is displaced further downward on the basis of an operation of the driving mechanism 133 for a pressing unit, the rollers 138 and 138 are rolled in the circumferential direction by driving the pressing unit 132 to be rotated in a state in which the outer circumferential surfaces of the rollers 138 and 138 are rollably pressed against the upper end surface of the forming die 134 for a caulking section, i.e., the upper end surfaces of the forming die elements 149 and 149. Accordingly, as the rolling surfaces of the rollers 138 and 138 are pressed against the other side surfaces of the forming die elements 149 and 149 in the axial direction in sequence, the cylindrical section 119 is plastically deformed outward in the radial direction to form the caulking section 120 by sequentially pressing the lower end surfaces of the forming die elements 149 and 149 (a portion of the processing surface 147) against the other end surface of the cylindrical section 119 of the hub main body 108 in the axial direction. The plurality of forming die elements (the plurality of elements) 149 are disposed to be movable independently at least in the axial direction. The driving mechanism (mechanism) 133 for a pressing unit has a mode of moving some of the plurality of forming die elements 149 (one of the forming die elements 149, or a small number of the forming die elements 149) in the axial direction and pressing a first region of the hub main body 108 (the workpiece), and a mode of moving some other of the plurality of forming die elements 149 in the axial direction and pressing a second region of the hub main body 108 (the workpiece). In the plastic working, the press region is varied in the circumferential direction.

Further, in the case of the embodiment, when the caulking section 120 is formed, the axial dimension $L_{159}$ of the gap 159 is larger than downward displacement amount (a processing stroke) of the forming die elements 149 and 149 at every time one roller 138 passes through the upper end surface of the forming die elements 149 and 149 in the circumferential direction. In addition, the cylinders 153 and 153 prevent disappearance of the gap 159 by continuing to apply a downward force on the holding plate 152.

In addition, in the case of the embodiment, processing of forming the above-mentioned caulking section 120 is terminated when a certain time elapses from the beginning of the plastic working of the cylindrical section 119. Then, it is determined that the caulking section 120 is appropriately formed when a press load of a cylinder 146 (see FIG. 15) that constitutes the driving mechanism 133 for a pressing unit (a load for displacing the pressing unit 132 downward) reaches a predetermined value and the pressing unit 132 is disposed at a predetermined position before the certain time has elapsed. On the other hand, it is determined that the caulking section 120 is not appropriately formed when the press load does not reach the predetermined value or the pressing unit 132 is not disposed at a predetermined position before the certain time has elapsed.

Further, when the second embodiment of the present invention is performed, processing of forming the above-mentioned the caulking section 120 can be continued until the press load reaches the predetermined value and the pressing unit 132 arrives at the predetermined position, and then can also be terminated after the predetermined time elapses.

According to the method and the device for manufacturing a rolling bearing unit of the above-mentioned embodiment, when processing of the other end portion of the hub main body 108 in the axial direction (the caulking section 120) is performed, an unbalanced load applied to the other end portion of the hub main body 108 in the axial direction can be reduced or can be made to substantially zero.

That is, in the case of the embodiment, when the caulking section 120 is formed, a load (processing force) applied to the cylindrical section 119 formed on the other end portion of the hub main body 108 in the axial direction becomes loads at equal intervals in the circumferential direction applied from the rollers 138 and 138 disposed at equal intervals in the circumferential direction via some of the forming die elements 149 and 149. For this reason, the caulking section 120 can be formed without substantially applying the unbalanced load to the other end surface of the cylindrical section 119 in the axial direction. Accordingly, after the formation of the caulking section 120, it becomes easier to bring the force of the caulking section 120 pressing the other end surface of the inner ring 109 in the axial direction more uniform throughout the circumference.

Third Embodiment

A third embodiment of the present invention will be described with reference to FIGS. 21 to 26C.

Figure 21:
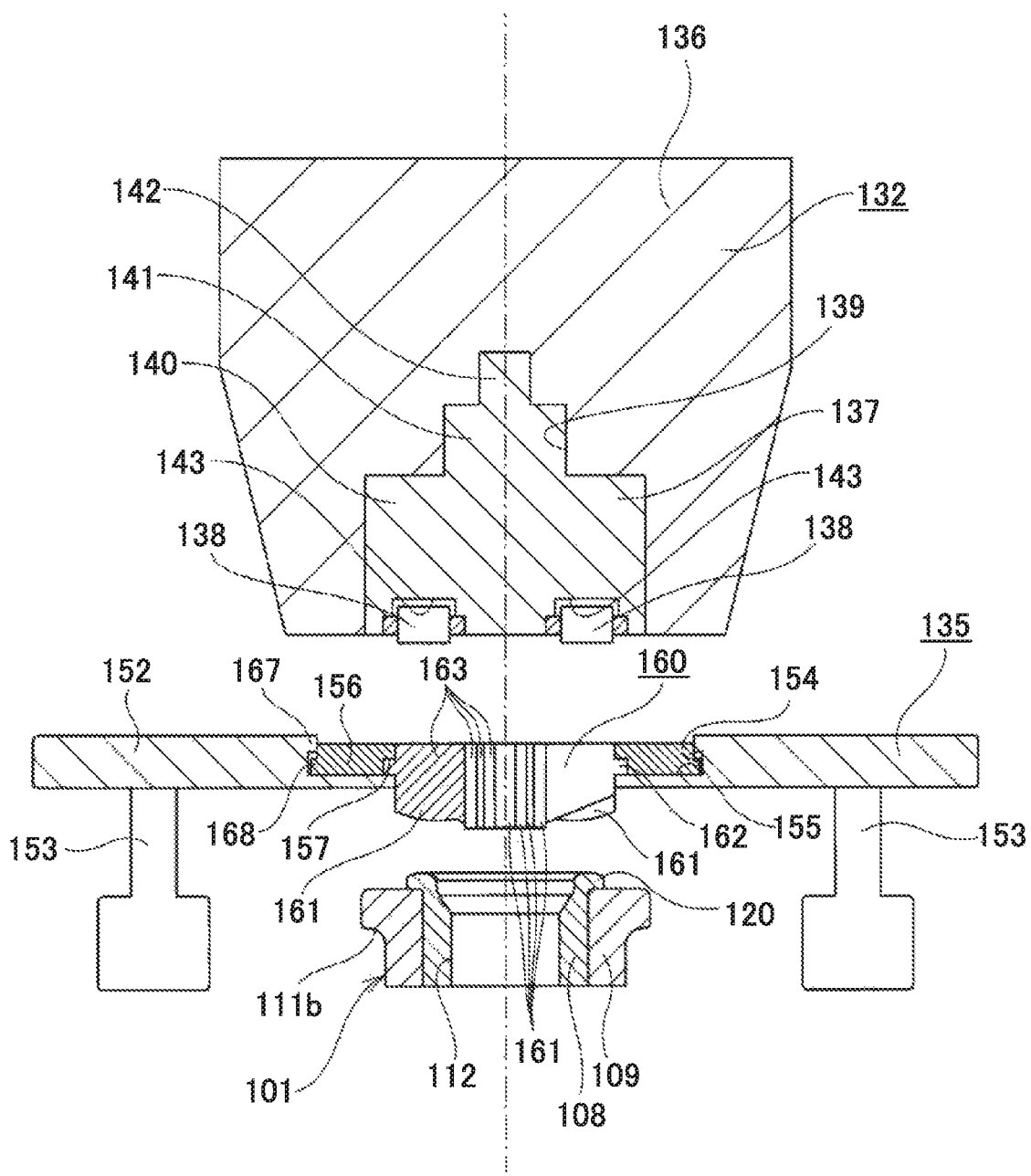
FIG. 21 is a cross-sectional view showing a portion of the processing apparatus according to a third embodiment of the present invention in a state before processing of forming a hub-side face spline is started.

FIG. 21 is a cross-sectional view showing a portion of the processing apparatus according to the third embodiment of the present invention in a state before starting a process of forming a hub-side face spline.

Figure 22:
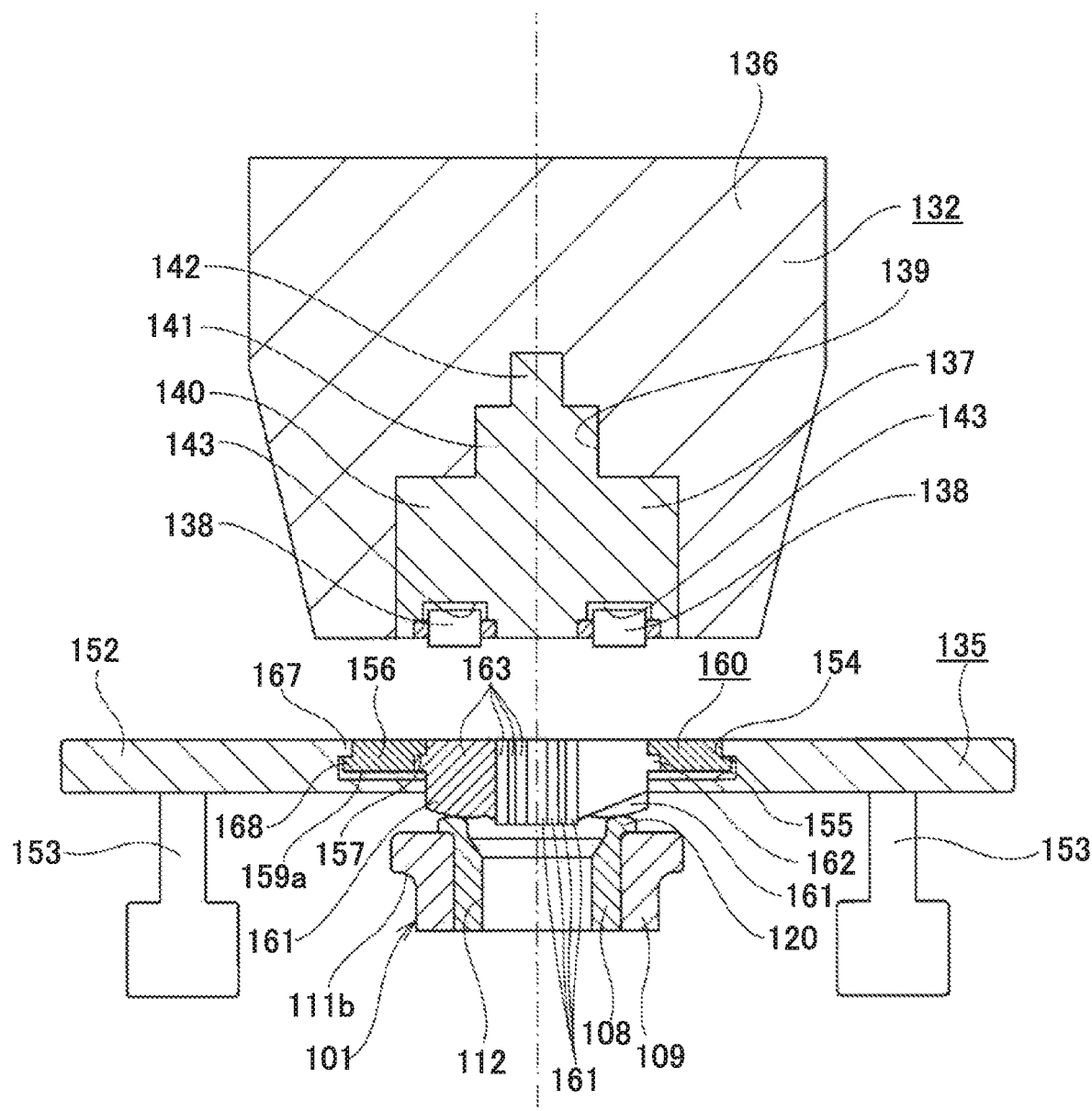
FIG. 22 is a cross-sectional view showing a portion of the processing apparatus of the third embodiment in a state in which a lower end surface of a forming die for a face spline abuts the other end surface of a caulking section of a hub main body in an axial direction after the state shown in FIG. 21.

FIG. 22 is a cross-sectional view showing a portion of the processing apparatus of the third embodiment in a state in which a lower end surface of a forming die for a face spline abuts the other end surface of a caulking section of a hub main body in an axial direction following the state shown in FIG. 21.

Figure 23:
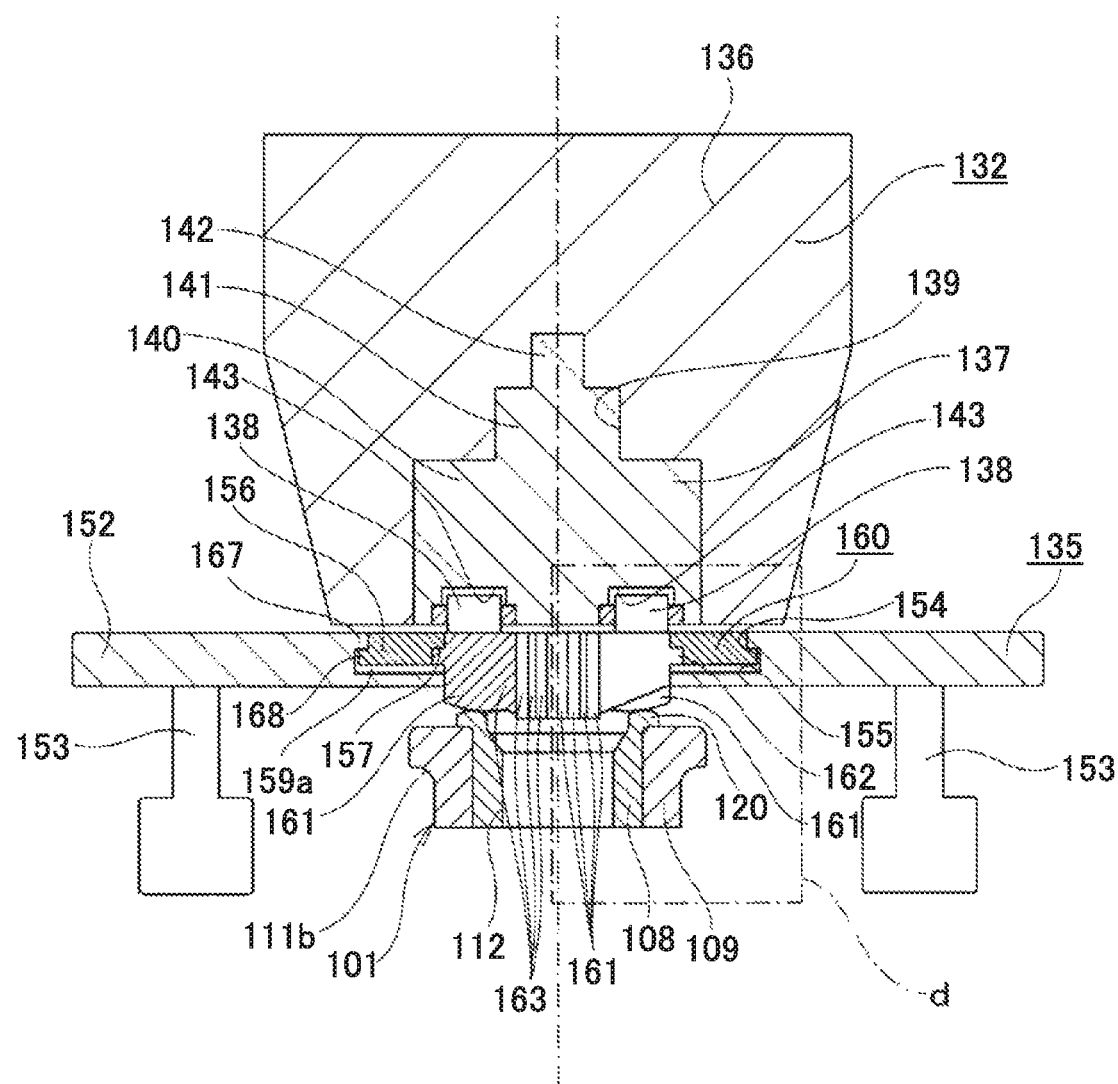
FIG. 23 is a cross-sectional view showing a portion of the processing apparatus of the third embodiment in a state in which a plurality of rollers abut an upper end surface of the forming die for a face spline after the state shown in FIG. 22.

FIG. 23 is a cross-sectional view showing a portion of the processing apparatus of the third embodiment in a state in which a plurality of rollers abut an upper end surface of the forming die for a face spline after the state shown in FIG. 22.

Figure 24:
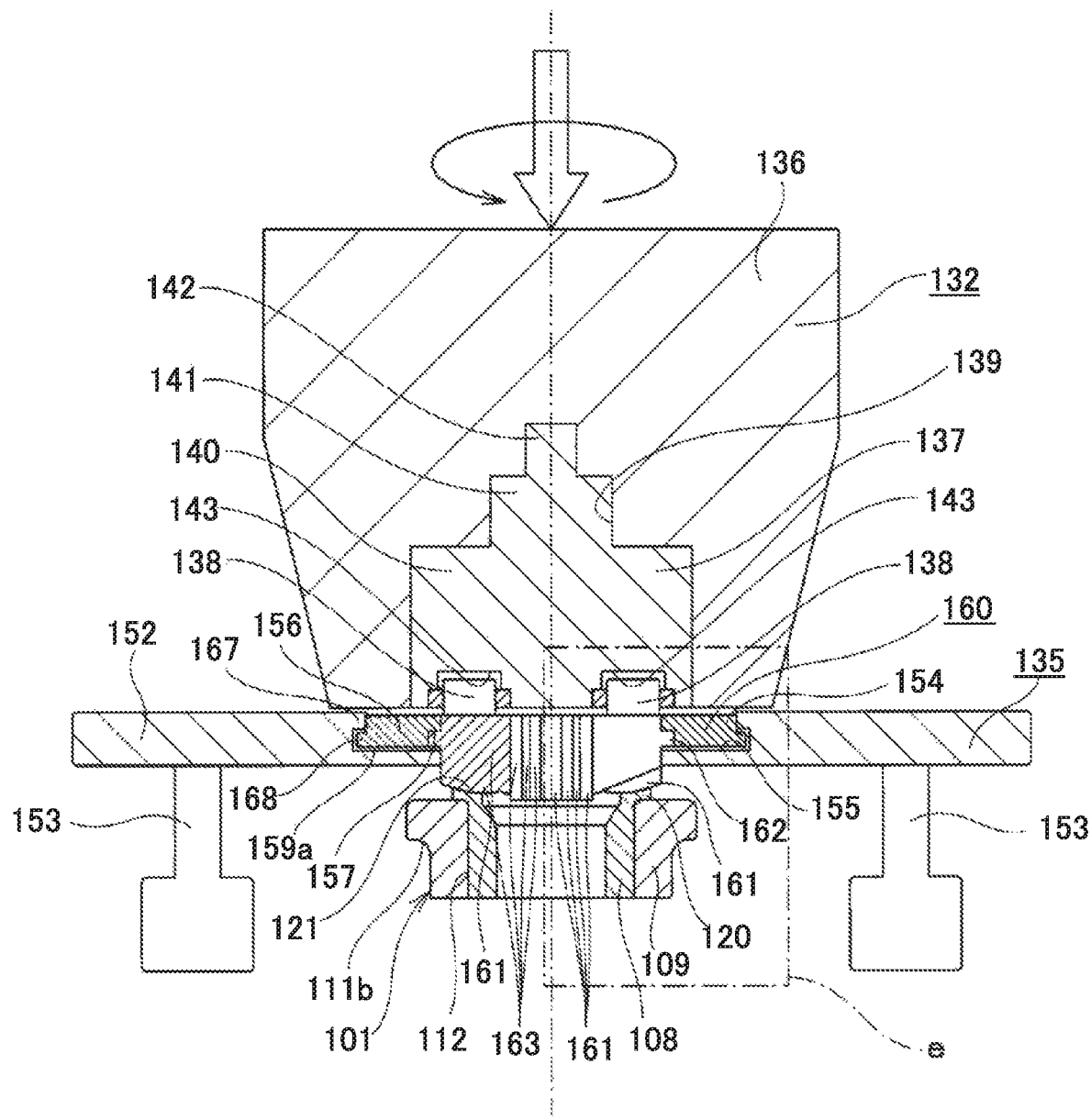
FIG. 24 is a cross-sectional view showing a portion of the processing apparatus of the third embodiment in a state after a caulking section of a hub main body is processed into a hub-side face spline after the state shown in FIG. 23.

FIG. 24 is a cross-sectional view showing a portion of the processing apparatus of the third embodiment in a state after a caulking section of a hub main body is processed into a hub-side face spline after the state shown in FIG. 23.

Figure 25A:
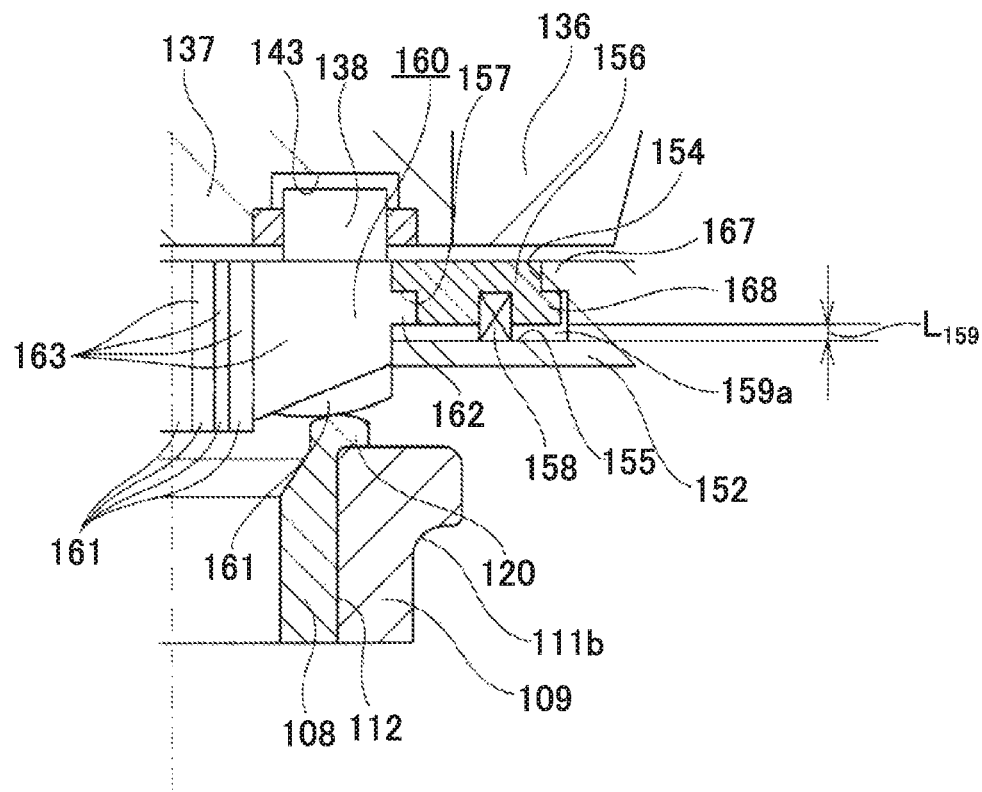
FIG. 25A is an enlarged view of a portion d in FIG. 23 of the third embodiment.
Figure 25B:
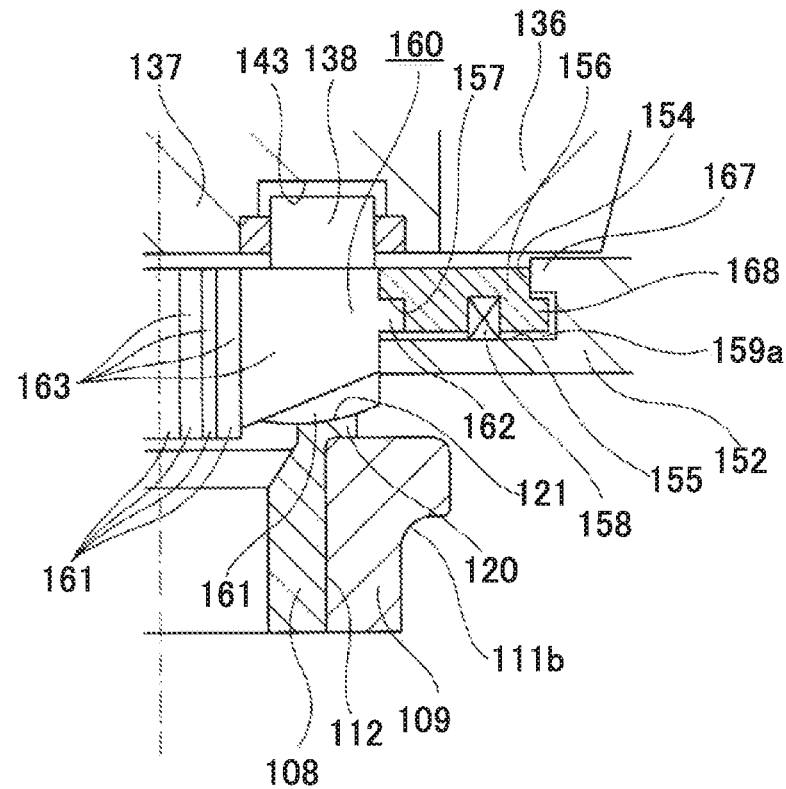
FIG. 25B is an enlarged view of a portion e in FIG. 24 of the third embodiment.

FIG. 25A is an enlarged view of a portion d in FIG. 23 of the third embodiment. FIG. 25B is an enlarged view of a portion e in FIG. 24 of the third embodiment.

Figure 26A:
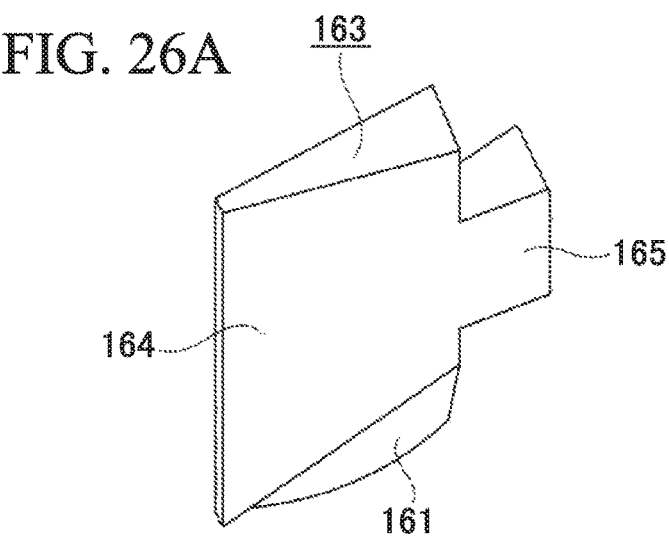
FIG. 26A is a perspective view showing one forming die element of the third embodiment that is taken out.
Figure 26B:
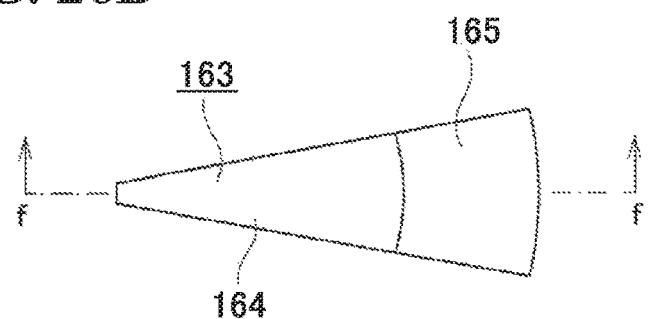
FIG. 26B is a plan view showing a forming die element in FIG. 26A of the third embodiment from above.
Figure 26C:
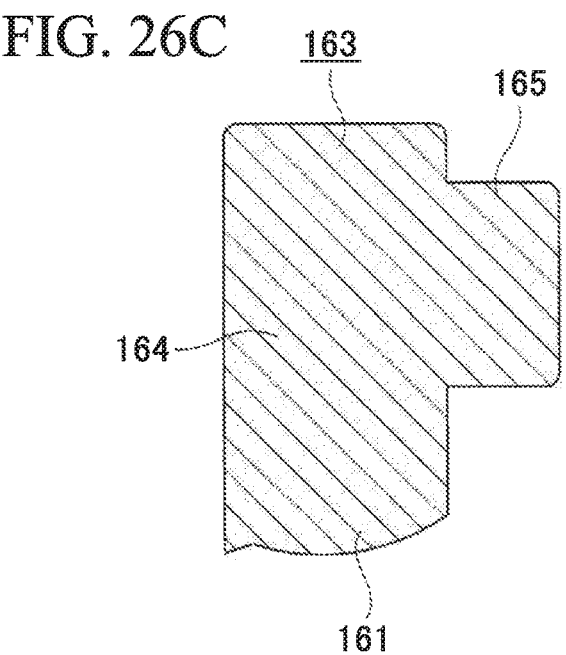
FIG. 26C is a cross-sectional view taken along line f-f in FIG. 26B of the third embodiment.

FIG. 26A is a perspective view showing one forming die element of the third embodiment that is taken out. FIG. 26B is a plan view showing a forming die element in FIG. 26A of the third embodiment from above. FIG. 26C is a cross-sectional view taken along line f-f in FIG. 26B of the third embodiment.

As an example of the manufacturing method of the embodiment, as shown in FIG. 27, the wheel-supporting rolling bearing unit 101 including the outer ring 103, the hub 104 (the hub main body 108 having the inner ring track 111a at one side in the axial direction on the outer circumferential surface of the intermediate section in the axial direction, and the inner ring 109 having the inner ring track 111b of the other side in the axial direction on the outer circumferential surface), and the plurality of rolling elements 105 and 105, wherein the caulking section 120 is formed on the inner end portion of the hub main body 108 in the axial direction, and further, the hub-side face spline 121 is formed on the other end surface of the caulking section 120 in the axial direction, will be described.

Further, in the embodiment, a method of forming the hub-side face spline 121 by performing plastic working on the caulking section 120 formed on the other end portion of the hub main body 108 in the axial direction will be described. Since the manufacturing method and the assembling method of the members (including a method of forming the caulking section 120) that constitute the wheel-supporting rolling bearing unit 101 until a formation of the hub-side face spline 121 is the same as the method widely known in the related art including the above-mentioned assembling method or the manufacturing method of the first example of the above-mentioned embodiment, description thereof will be omitted in the embodiment.

Further, in FIGS. 21 to 24, only a portion of the wheel-supporting rolling bearing unit 101 (the other end side portion of the hub main body 108 in the axial direction and the inner ring 109) is shown, and illustration of other portions will be omitted.

In addition, in the following description according to the embodiment, the upward/downward direction is the upward/downward direction in FIGS. 21 to 25B. However, the upward/downward direction in FIGS. 21 to 25B is not necessarily limited to the upward/downward direction during processing.

The processing apparatus (the manufacturing apparatus) for forming the hub-side face spline 121 is distinguished from the processing apparatus of the second embodiment in that a forming die 160 for a face spline is provided instead of the forming die 134 for a caulking section (see FIGS. 14 and 16 to 18) serving as the forming die. Structures and actions of the other portions are substantially the same as in the processing apparatus of the second embodiment.

The forming die 160 for a face spline is configured in a substantially cylindrical shape as a whole, the same number of processing teeth 161 and 161 as the number of teeth of the hub-side face spline 121 are formed on the lower end surface serving as one end surface in the axial direction at equal pitches in the circumferential direction, and a flange section 162 protruding outward in the radial direction is formed on the intermediate section of the outer circumferential surface in the axial direction throughout the circumference. The forming die 160 for a face spline is configured by combining the plurality of (for example, 20 to 40, in the case of the embodiment, the same number as the processing teeth 161 and 161) forming die elements 163 and 163 divided in the circumferential direction (for example, the plurality of forming die elements 163 and 163 disposed side by side in the circumferential direction about the central axis of the hub main body 108). In other words, the forming die 160 for a face spline is configured by combining the forming die elements 163 in the circumferential direction each constituted by an element main body 164 formed in a fan shape when seen from the axial direction and having one processing tooth 161 on a lower end surface thereof, and a protrusion 165 formed on the intermediate section of the outer circumferential surface of the element main body 164 in the axial direction and serving as a portion of the flange section 162 in the circumferential direction.

In this embodiment as well, like the case of the forming die 134 for a caulking section of the above-mentioned second embodiment, the forming die 160 for a face spline is held in the radial direction and the circumferential direction without rattling in a state in which the forming die elements 163 and 163 are axially displaceable independently from each other in the holding hole 154 formed on the central section of the holding plate 152 that constitutes the elevation mechanism 135 for a forming die. In addition, in a state before starting the process of forming the hub-side face spline 121 (a state shown in FIG. 21), the flange section 162 of the forming die 160 for a face spline is disposed between the step surface section 155 of the holding hole 154 and the step surface section 157 of the presser plate 156 by elastic force of the biasing spring 158 (see FIGS. 25A and 25B) configured to stabilize a posture of the forming die 160 for a face spline. In addition, in this state, a gap is formed between the upper surface of the outward flange section 168 of the presser plate 156 and the lower surface of the inward flange section 167 of the holding plate 152.

When the hub-side face spline 121 is formed on the other end portion of the caulking section 120 in the axial direction using the above-mentioned processing apparatus, first, as shown in FIG. 21, the cylinders 153 and 153 that constitute the elevation mechanism 135 are operated to place the holding plate 152 at an upper side in the vertical direction such that the processing teeth 161 and 161 formed on the lower end surface of the forming die 160 for a face spline do not abut the other end surface of the wheel-supporting rolling bearing unit 101 in the axial direction held by the holder 131 (see FIG. 15) (the other end surface of the caulking section 120 in the axial direction). In this state, as described above, the flange section 162 of the forming die 160 for a face spline is disposed between the step surface section 155 of the holding hole 154 and the step surface section 157 of the presser plate 156 by elastic force of the biasing spring 158. In addition, the wheel-supporting rolling bearing unit 101 is held in a state in which the central axis of the hub main body 108 coincides with the holder 131 in the vertical direction and the other end portion of the hub main body 108 in the axial direction is directed upward.

Next, as shown in FIGS. 21 and 22, as the cylinders 153 and 153 are operated to displace the holding plate 152 downward, the processing teeth 161 and 161 of the forming die 160 for a face spline abut the other end surface of the caulking section 120 in the axial direction. From this state, as the holding plate 152 is displaced further downward, the forming die 160 for a face spline and the presser plate 156 are displaced upward with respect to the holding plate 152 against elastic force of the biasing spring 158. Then, as shown in FIGS. 22 and 25A, a gap 159a in the axial direction (the upward/downward direction) is formed between the lower surface of the flange section 162 of the forming die 160 for a face spline and the step surface section 155 of the holding hole 154 by bringing the upper surface of the outward flange section 168 of the presser plate 156 in contact with the lower surface of the inward flange section 167 of the holding plate 152. An axial dimension $L_{159a}$ of the gap 159a will be described below.

Next, as shown in FIGS. 22 and 23, as the driving mechanism 133 for a pressing unit is operated to displace the pressing unit 132 downward, the outer circumferential surfaces of the rollers 138 and 138 are made to rollably abut the upper end surface that is the other end surface of the forming die 160 for a face spline in the axial direction.

Next, as shown in FIGS. 23 and 24 {and FIGS. 25A and 25B}, as the pressing unit 132 is displaced further downward on the basis of the operation of the driving mechanism 133 for a pressing unit, the rollers 138 and 138 are rolled in the circumferential direction by rotating and driving the pressing unit 132 in a state in which the outer circumferential surfaces of the rollers 138 and 138 are rollably pressed against the upper end surface of the forming die 160 for a face spline, i.e., the upper end surfaces of the forming die elements 163 and 163. Accordingly, the other end surface of the caulking section 120 in the axial direction is plastically deformed to form the hub-side face spline 121 by sequentially pressing the rolling surfaces of the rollers 138 and 138 against the other side surfaces of the forming die elements 163 and 163 in the axial direction and sequentially pressing the processing teeth 161 and 161 of the forming die elements 163 and 163 against the other end surface of the caulking section 120 in the axial direction.

Further, in the case of the embodiment, the axial dimension $L_{159a}$ of the gap 159a in the axial direction is larger than downward displacement (a processing stroke) of the forming die elements 163 and 163 every time the one roller 138 passes through the upper end surfaces of the forming die elements 163 and 163 in the circumferential direction when the hub-side face spline 121 is formed. In addition, the cylinders 153 and 153 prevent disappearance of the gap 159a by continuing to apply a downward force to the holding plate 152.

In addition, in the case of the embodiment, processing of forming the hub-side face spline 121 is terminated when a certain time elapses from the beginning of the plastic working of the caulking section 120. Then, it is determined that the hub-side face spline 121 is appropriately formed when a press load (a load that displaces the pressing unit 132 downward) of the cylinder 146 (see FIG. 15) that constitutes the driving mechanism 133 for a pressing unit reaches a predetermined value and when the pressing unit 132 is disposed at a predetermined position, before the certain time elapses. On the other hand, it is determined that the hub-side face spline 121 is not appropriately formed when the press load does not reach the predetermined value or when the pressing unit 132 is not disposed at a predetermined position, before the certain time elapses.

Further, when the third embodiment of the present invention is performed, processing of forming the hub-side face spline 121 can be continued until the press load reaches the predetermined value and the pressing unit 132 arrives at the predetermined position, and then can be terminated after a predetermined time elapses.

According to the method and the device for manufacturing the rolling bearing unit of the above-mentioned embodiment, when processing of the other end portion of the hub main body 108 in the axial direction (the hub-side face spline 121) is performed, an unbalanced load applied to the other end portion of the hub main body 108 in the axial direction can be reduced or can be substantially zero.

That is, in the case of the embodiment, when the hub-side face spline 121 is formed, a load (a processing force) applied to the other end surface of the caulking section 120 in the axial direction becomes a load at equal intervals in the circumferential direction applied from the rollers 138 and 138 disposed at equal intervals in the circumferential direction via some of the forming die elements 163 and 163. For this reason, the hub-side face spline 121 can be formed without substantially applying the unbalanced load to the other end surface of the caulking section 120 in the axial direction. Accordingly, after the formation of the hub-side face spline 121, it becomes easier to bring the force of the caulking section 120 pressing the other end surface of the inner ring 109 in the axial direction more uniform throughout the circumference.

In one embodiment, it is possible to provide a method of manufacturing a rolling bearing unit capable of suppressing manufacturing cost while securing durability of the rolling bearing unit.

In another embodiment, it is possible to provide a method and a device for manufacturing a rolling bearing unit capable of reducing an unbalanced load applied to the other portion of a hub main body in an axial direction or causing the unbalanced load to be substantially zero when processing of the other end portion of the hub main body in the axial direction (a caulking section, a hub-side face spline) is performed.

In the embodiment, in a state in which one end surface of the forming punch in the axial direction faces the other end surface of the caulking section in the axial direction, a roll having the central axis inclined with respect to the central axis of the hub main body is rotated about the central axis of the hub main body while pressing the other end surface of the forming punch in the axial direction using the pressing surface of the roll. Accordingly, the processing teeth formed on one end surface of the forming punch in the axial direction are pressed against the other end surface of the caulking section in the axial direction to form the hub-side face spline on the other end surface of the caulking section in the axial direction. Here, the plurality of punch elements that constitute the forming punch can be displaced in the axial direction and inhibit displacement in the circumferential direction. Accordingly, during processing of forming the hub-side face spline, the processing teeth can be prevented from being inclined with respect to the tooth surface of the teeth that constitute the hub-side face spline, and occurrence of local abutting between the processing surface of the roll and the end surface of the caulking section in the axial direction such as local plastic deformation of the tooth surface of the tooth that constitutes the hub-side face spline can be prevented. Accordingly, straightness of the teeth can be improved, and durability of the bearing unit can be sufficiently secured. In addition, a wasteful increase in a force pressing the pressing surface of the roll toward the other side in the axial direction is suppressed, an increase in size of the processing apparatus used for processing of forming the hub-side face spline can be prevented, and an increase in manufacturing cost is suppressed.

In another embodiment, when the caulking section is formed, a load (a processing force) applied to the cylindrical section formed on the other portion of the hub main body in the axial direction becomes loads at a plurality of places in the circumferential direction applied from the plurality of rollers disposed at the plurality of places in the circumferential direction around the central axis of the hub main body via some of the forming die elements. For this reason, in comparison with the case in which processing of the caulking section is performed by rotary forging, an unbalanced load applied to the cylindrical section formed on the other portion of the hub main body in the axial direction can be reduced or can be substantially zero.

In addition, when the hub-side face spline is formed, a load (a processing force) applied to the caulking section formed on the other end portion of the hub main body in the axial direction becomes loads at a plurality of places in the circumferential direction applied from the plurality of rollers disposed at the plurality of places in the circumferential direction about the central axis of the hub main body via some of the forming die elements. For this reason, in comparison with the case in which processing of the hub-side face spline is performed by rotary forging, an unbalanced load applied to caulking section formed on the other portion of the hub main body in the axial direction can be reduced or can be made to substantially zero.

The manufacturing method of the present invention is not limited to the rolling bearing units described in the above-mentioned embodiments and may be applied to various kinds of rolling bearing units that satisfy requirements disclosed in the claims.

For example, in the present invention, the invention having a feature in the method of forming the caulking section may be applied to a rolling bearing unit in which the hub-side face spline is not formed on the other end surface of the caulking section in the axial direction in a state after completion.

In addition, when the present invention is performed, an aspect in which the plurality of rollers are disposed with a rotationally symmetrical positional relation to the central axis of the hub main body on the circumference about the central axis of the hub main body is not limited to an aspect in which the plurality of rollers are disposed at equal intervals in the circumferential direction. For example, an aspect in which two (or three) rollers are disposed respectively side by side in the circumferential direction at each of two places (or three places or four places) at equal intervals in the circumferential direction may be employed. Even when such an aspect is employed, the caulking section (the hub-side face spline) can be formed without substantially applying the unbalanced load to the cylindrical section (the caulking section) of the hub main body.

REFERENCE SIGNS LIST

1 Wheel-supporting rolling bearing unit
2 Outer ring for constant velocity joint
3 Outer ring
4 Hub
5 Rolling element
6 Standstill-side flange
7a, 7b Outer ring track
8 Hub main body
9 Inner ring
10 Rotation-side flange
11a, 11b Inner ring track
12 Small diameter step section
13 Center hole
14 Small diameter section
15 Bolt
16 Rod section
17 Male screw section
18 Head portion
19 Cylindrical section
20 Caulking section
21 Hub-side face spline
22 Mouth section
23 End wall section
24 Shaft section
25 Screw hole
26 Joint-side face spline
27 Inner ring for constant velocity joint
28 Ball
29a, 29b Holder
30, 30a Roll
31 Processing surface
32 Face spline teeth
33 Processing teeth
34 Concave section
35 Step section
36 Rotating press apparatus
37 Base frame
38 Holder
39 Forming punch
40 Punch elevation mechanism
41 Cylindrical section
42 Holding concave section
43 Pressing surface
44 Processing teeth
45 Flange section
46 Punch element
47 Element main body
48 Protrusion
49 Punch holding plate
50 Hydraulic cylinder
51 Holding hole
52 Step surface section
53 Closing plate
54 Gap
101 Wheel-supporting rolling bearing unit
102 Outer ring for constant velocity joint
103 Outer ring
104 Hub
105 Rolling element
106 Standstill-side flange
107a, 107b Outer ring track
108 Hub main body
109 Inner ring
110 Rotation-side flange
111a, 111b Inner ring track
112 Small diameter step section
113 Center hole
114 Small diameter section
115 Bolt
116 Rod section
117 Male screw section
118 Head portion
119 Cylindrical section
120 Caulking section
121 Hub-side face spline 122 Mouth section
123 End wall section
124 Shaft section
125 Screw hole
126 Joint-side face spline
127 Inner ring for constant velocity joint
128 Ball
129a, 129b Holder
130 Base frame
131 Holder
132 Pressing unit
133 Driving mechanism for pressing unit
134 Forming die for caulking section
135 Elevation mechanism for forming die
136 Head
137 Roller tool
138 Roller
139 Attachment hole
140 Large diameter column section
141 Intermediate diameter column section
142 Small diameter column section
143 Holding concave section
144 Electric motor
145 Spindle
146 Cylinder
147 Processing surface
148 Flange section
149 Forming die element
150 Element main body
151 Protrusion
152 Holding plate
153 Cylinder
154 Holding hole
155 Step surface section
156 Presser plate
157 Step surface section
158 Biasing spring
159, 159a Gap
160 Forming die for face spline
161 Processing teeth
162 Flange section
163 Forming die element
164 Element main body
165 Protrusion
166 Support column
167 Inward flange section
168 Outward flange section

The invention claimed is:

1. An apparatus for manufacturing a rolling bearing unit, the apparatus being operable to press other end surface of an inner ring in an axial direction with a caulking section formed by plastically deforming a cylindrical section, formed on other portion of a hub main body in the axial direction, outward in a radial direction in order to apply a coupling force, which is directed toward one side of the hub main body in the axial direction, to the inner ring fitted onto the hub main body, the apparatus comprising:
a forming die for forming the caulking section, the forming die including a plurality of forming die elements disposed side by side in a circumferential direction about a central axis of the hub main body and displaceable in the axial direction independently with each other;
a pressing unit that includes a plurality of rollers to be located in the circumferential direction about the central axis of the hub main body and that causes the rollers to rollably abut the plurality of forming die elements of the forming die for forming a caulking section; and
a driving mechanism for the pressing unit, the driving mechanism being configured to apply a driving force to the pressing unit for plastically deforming the cylindrical section, which is formed on the end portion of the hub main body in the axial direction, outward in the radial direction by pressing a rolling surface of each of the rollers against the plurality of forming die elements of the forming die in sequence and by sequentially pressing each of the forming die elements against the cylindrical section in the axial direction,
wherein, in the forming die for forming the caulking section, a processing surface is formed on one end surface in the axial direction, the processing surface being an annular concave surface having an arc-shaped cross section and having a shape that matches the other end surface of the caulking section in the axial direction.

2. The apparatus for manufacturing a rolling bearing unit according to claim 1,
wherein each of the rollers is configured to be disposed on a circumference about the central axis of the hub main body with a rotationally symmetrical positional relation about the central axis of the hub main body.

3. The apparatus for manufacturing a rolling bearing unit according to claim 2,
wherein a total number of the rollers are smaller than a total number of the forming die elements.

4. An apparatus for manufacturing a vehicle using the apparatus for manufacturing a rolling bearing unit according to claim 1.

* * * * *